United States Patent
Saeki et al.

[19]

[11] Patent Number: 6,046,626
[45] Date of Patent: Apr. 4, 2000

[54] VOLTAGE TRANSFER CIRCUIT AND A BOOSTER CIRCUIT, AND AN IC CARD COMPRISING THE SAME

[75] Inventors: Yukihiro Saeki; Yasoji Suzuki, both of Yokohama, Japan

[73] Assignees: Kabushiki Kaisha Toshiba, Kawasaki; Tokai University Educational System, Tokyo, both of Japan

[21] Appl. No.: 09/003,946

[22] Filed: Jan. 8, 1998

[30] Foreign Application Priority Data

Jan. 9, 1997 [JP] Japan ................................. 9-001766

[51] Int. Cl.[7] ........................................................ G05F 3/02
[52] U.S. Cl. ............................................ 327/536; 327/537
[58] Field of Search .................................. 327/534, 536, 327/537

[56] References Cited

U.S. PATENT DOCUMENTS

| | | | |
|---|---|---|---|
| 4,511,811 | 4/1985 | Gupta | 327/111 |
| 4,849,661 | 7/1989 | Bazes | 326/71 |
| 5,029,063 | 7/1991 | Lingstaedt et al. | 363/60 |
| 5,404,329 | 4/1995 | Yamagata et al. | 365/189.09 |
| 5,444,362 | 8/1995 | Chung et al. | 323/313 |
| 5,519,654 | 5/1996 | Kato et al. | 365/185.23 |
| 5,701,096 | 12/1997 | Higashiho | 327/536 |

FOREIGN PATENT DOCUMENTS 54-53240  4/1979  Japan.

*Primary Examiner*—Terry D. Cunningham
*Attorney, Agent, or Firm*—Finnegan, Henderson, Farabow, Garrett & Dunner, L.L.P.

[57] ABSTRACT

A voltage transfer circuit comprises a first MOS transistor of a first channel type having a drain terminal connected to a first node supplied with a predetermined voltage, a source terminal connected to a second node, and a gate terminal, a second MOS transistor of a first channel type having a source terminal connected to the second node, a drain terminal connected to the gate terminal of the first MOS transistor, and a gate terminal supplied with a clock signal, as well as a third MOS transistor of a second channel type having a drain terminal connected to the drain terminal of the second MOS transistor, a source terminal connected to a third node supplied with a reference voltage, and a gate terminal supplied with the clock signal.

4 Claims, 12 Drawing Sheets

VOLTAGE TRANSFER CIRCUIT AND A BOOSTER CIRCUIT, AND AN IC CARD COMPRISING THE SAME

BACKGROUND OF THE INVENTION

The present invention relates to a voltage transfer circuit and a booster circuit included in a semiconductor device such as an IC card or the like, particularly, to a booster circuit having high booster efficiency.

A non-volatile memory such as a flash memory or an EEPROM, or a dynamic semiconductor memory is internally provided with a booster circuit, and a power source. voltage supplied from an external device is boosted to generate a high voltage of a positive or negative polarity.

In general, a booster circuit consists of a capacitor and a diode element. An example of a conventional booster circuit is shown in FIG. 1. In the example, two diodes D1 and D2 are connected in series. An anode terminal of the diode element D1 in the first stage is connected to a node of a power source voltage VDD of a positive polarity, while a cathode terminal thereof is connected with a terminal of a capacitor C. Another terminal of the capacitor C is supplied with a clock signal CLK. Meanwhile, an anode terminal of the diode D2 in the second stage is connected with a cathode terminal of the diode D1 in the first stage, and a cathode terminal of the diode D2 is used as an output.

Next, operation of a booster circuit constructed in a structure as described above will be explained with reference to a waveform chart shown in FIG. 2.

Suppose that a clock signal CLK is of a ground (GND) level (or logic 0 level). The voltage of a node A of a cathode terminal of the diode D1 in the first stage is decided by VDD−VF since the anode terminal is connected to a node of a power source voltage VDD. VF denotes a forward voltage of the diode. In addition, the output, i.e., the voltage of the cathode terminal of the diode D2 is decided by VDD−2 VF, decreased by VF from the above-mentioned voltage.

When the clock signal CLK goes to a VDD level (or logic 1 level), the voltage of the node A of the A cathode terminal of the diode D1 in the first stage is increased by a differential voltage VDD since the clock signal CLX supplied to the capacitor C is changed from the GVD to the VDD, i.e., VDD−VF+VDD=2 VDD−VF. Here, the voltage of the output terminal is decided by 2 VDD−2 VF.

Further, when the clock signal CLK goes to a GND level, the voltage of the node A of the cathode terminal of the diode D1 in the first stage returns again to VDD−VF. In this state, the voltage of the cathode terminal (or output) of the diode D2 in the second stage has just been 2 VDD−2 VF, so that the voltage of the anode terminal is higher than the voltage of the cathode terminal. Specifically, the diode D2 in the second stage is brought into a reverse bias state, so that no electric charges move. Therefore, the boosted output maintains a voltage of 2 VDD−2 VF. In general, VF is about 0.6V, and therefore, the boosted output voltage is 5.4V when VDD=3.3V is chosen. This means that a boosted voltage of 5.4V is obtained from a power source voltage of 3.3V.

In practice, an output of a booster circuit normally has a charge capacitance which is much greater than that of a capacitor C in a booster circuit. A boost output terminal has a parasitic leakage current path which causes a slight leakage current to flow from a boosted voltage. If no charge is supplied from the anode terminal side of the diode D2 in the second stage, charges stored in the charge capacitance flows through the leakage current path, the boosted voltage decreases with the lapse of time. The decrease of the boosted voltage is shown in FIG. 2.

Next, when the clock signal CLK goes to a VDD level again, the boosted output voltage is increased to 2 VDD−2 VF.

A conventional circuit shown in FIG. 1 is capable of achieving the same functions even if the diode is replaced with an N-channel MOS transistor (which will be referred to as only an NMOS transistor hereinafter). For example, if a gate terminal of an NMOS transistor is connected to its own source terminal, a characteristic similar to a diode is obtained since the source terminal serves as an anode terminal and the drain terminal serves as a cathode terminal. In this case, a voltage corresponding to a forward voltage VD of the diode is VthN. FIG. 3 shows another example of a conventional booster circuit in which diodes D1 and D2 in the conventional circuit shown in FIG. 1 are replaced with NMOS transistors N31 and N32 each having a gate terminal connected with a source terminal.

In a conventional circuit using a diode shown in FIG. 1, the boosted voltage is 2 VDD−2 VF at most, as described above. In other words, the maximum boosted voltage is a value smaller than 2 VDD by 2 VF. In case of a circuit shown in FIG. 3 in which diodes are replaced with NMOS transistors, the maximum value of the boosted voltage is 2 VDD−2 VthN and is thus a value smaller than 2 VDD by 2 VthN. Thus, conventional circuits cannot avoid decreases in voltage as described above and therefore achieve a low boost efficiency.

As described above, a conventional circuit causes a problem as follow because of its insufficient boost efficiency. For example, a non-volatile memory requires a ten times higher voltage (15V) than a power source voltage VDD (1.5V) supplied from outside. In this case, booster circuits each shown in FIG. 3 are cascade-connected with each other in a plurality of stages, as shown in FIG. 4, to obtain a desired boosted voltage. Fore example, where an NMOS transistor having a threshold voltage VthN of 0.7V is used, twenty stages are required. If the number of stages is thus increased, the occupation area of the booster circuits must be increased and is very disadvantageous for an integrated circuit. The current consumption increases as the number of capacitors for supplying clock signals increases, and therefore, the performance is deteriorated in view of the purpose of low power consumption use such as a battery-driven device or the like.

BRIEF SUMMARY OF THE INVENTION

The present invention has an object of providing a booster circuit with a high boosting efficiency, a voltage transfer circuit for constituting the booster circuit, and an IC card comprising the boaster circuit.

According to a first aspect of the invention relating to a voltage transfer circuit, there is provided a voltage transfer circuit comprising: a first MOS transistor of a first channel type having a drain terminal connected to a first node supplied with a predetermined voltage, a source terminal connected to a second node, and a gate terminal; a second MOS transistor of a first channel type having a source terminal connected to the second node, a drain terminal connected to the gate terminal of the first MOS transistor, and a gate terminal supplied with a clock signal; and a third MOS transistor of a second channel type having a drain terminal connected to the drain terminal of the second MOS transistor, a source terminal connected to a third node supplied with a reference voltage, and a gate terminal supplied with the clock signal.

According to a second aspect of the present invention relating to a voltage transfer circuit, there is provided a voltage transfer circuit comprising: a first MOS transistor of a first channel type having a drain terminal connected to a first node supplied with a predetermined voltage, a source terminal connected to a second node, and a gate terminal; a second MOS transistor of the first channel type having a source terminal connected to the second node, a drain terminal connected to the gate terminal of the first MOS transistor, and a gate terminal connected to the first node; and a third MOS transistor of a second channel type having a drain terminal connected to the drain terminal of the second MOS transistor, a source terminal connected to a third node supplied with a reference voltage, and a gate terminal supplied with a clock signal.

Preferred embodiments of the voltage transfer circuits according to the above first and second aspects of the invention will be described below.

(1) The first to third MOS transistors have back gate terminals respectively connected to the source terminals of their own.

(2) The predetermined voltage supplied to the first node is a ground voltage of a positive polarity, the MOS transistors of the first channel type are P-channel type MOS transistors, and the second MOS transistor of the second channel type is an N-channel type MOS transistor.

(3) The predetermined voltage supplied to the first node is a ground voltage of a positive polarity, the MOS transistors of the first channel type are N-channel type MOS transistors, and the second MOS transistor of the second channel type is a P-channel type MOS transistor.

According to a first aspect of the present invention relating to a booster circuit, there is provided a booster circuit comprising: a first MOS transistor of a first channel type having a drain terminal connected to a first node supplied with a predetermined voltage, a source terminal connected to a second node (n2), and a gate terminal; a second MOS transistor of the first channel type having a source terminal connected to the second node, a drain terminal connected to the gate terminal of the first MOS transistor, and a gate terminal supplied with a clock signal; a third MOS transistor of a second channel type having a drain terminal connected to the drain terminal of the second MOS transistor, a source terminal connected to a third node supplied with a reference voltage, and a gate terminal supplied with the clock signal; and a capacitor having a first terminal connected to the second node and a second terminal supplied with a second clock signal having an inverse phase of the first clock signal.

According to a second aspect of the present invention relating to a booster circuit, there is provided a booster circuit comprising: a first MOS transistor of a first channel type having a drain terminal connected to a first node supplied with a predetermined voltage, a source terminal connected to a second node (n2), and a gate terminal; a second MOS transistor of a first channel type having a source terminal connected to the second node, a drain terminal connected to the gate terminal of the first MOS transistor, and a gate supplied with a clock signal; a third MOS transistor of a second channel type having a drain terminal connected to the drain terminal of the second MOS transistor, a source terminal connected to a third node supplied with a reference voltage, and a gate terminal supplied with the clock signal; a capacitor having a first terminal connected to the second node and a second terminal supplied with a second clock signal having an inverse phase of the first clock signal; a fourth MOS transistor of the first channel type having a drain terminal connected to the second node, a source terminal connected to a fourth node through which an output voltage is obtained, and a gate terminal; a fifth MOS transistor of the first channel type having a source terminal connected to the fourth node, a drain terminal connected to the gate terminal of the fourth MOS transistor, and a gate terminal connected to the second node; and a sixth MOS transistor of the second channel type having a drain terminal connected to the drain terminal of the fifth MOS transistor, a source terminal connected to the third node, and a gate terminal supplied with the second clock signal.

According to a third aspect of the present invention relating to a booster circuit, there is provided a booster circuit comprising: a first voltage transfer circuit comprising a first MOS transistor of a first channel type having a drain terminal connected to a first node supplied with a predetermined voltage, a source terminal connected to a second node, and a gate terminal, a second MOS transistor of the first channel type having a source terminal connected to the second node, a drain terminal connected to the gate terminal of the first MOS transistor, and a gate terminal supplied with a first clock terminal, and a third MOS transistor of a second channel type having a drain terminal connected to the drain terminal of the second MOS transistor, a source terminal connected to a third node supplied with a reference voltage, and a gate terminal supplied with the first clock signal; N second voltage transfer circuits (where N is a positive integer), each including a fourth MOS transistor of the first channel type having a drain terminal connected to a fourth node, a source terminal connected to a fifth node, and a gate terminal, a fifth MOS transistor of the first channel type having a source terminal connected to the fifth node, a drain terminal connected to the gate terminal of the fourth MOS transistor, and a gate terminal connected to the fourth node, and a sixth MOS transistor having a drain terminal connected to the drain terminal of the fifth MOS transistor, a source terminal connected to the third node 3, and a gate terminal connected to a second clock terminal; and N capacitors each having first and second ends, wherein the first node of the first voltage transfer circuit is supplied with a power source voltage, the N second voltage transfer circuits are longitudinally connected with each other in multiple stages such that the fifth node in each stage is connected to the fourth node in a successive stage, that the fourth node of the second voltage transfer circuit in a front end stage is connected to the second node of the first voltage transfer circuit, and that a boosted voltage is outputted from the fifth node of the second voltage transfer circuit in a last stage, the first ends of the N capacitors are respectively connected to a connection node between the second node of the first voltage transfer circuit and the fourth node of the second voltage transfer circuit in the front end stage, and connection nodes each between the fourth node of the second voltage transfer circuit in preceding one of adjacent two of the multiple stages and the fifth node of the second voltage transfer circuit in successive one of the adjacent two of the multiple stages, the first clock terminal of the first voltage transfer circuit is supplied with a first clock signal, the second clock terminals of the second voltage transfer circuits in odd-numbered stages of the multiple stages including the front end stage are supplied with a second clock signal having an inverse phase of the first clock signal, while the second clock terminals of the second voltage transfer circuits in even-numbered stages of the multiple stages are supplied with the first clock signal, and the second ends of the capacitors having the first ends connected to the fourth nodes of the second voltage transfer circuits in the odd-numbered stages among the N second voltage transfer circuits are supplied with the second clock signal, while the second ends of the capacitors having the first ends connected to the fourth nodes of the second voltage transfer circuits in the even-numbered stages are supplied with the first clock signal.

According to a fourth aspect of the present invention relating to a booster circuit, there is provided a booster circuit comprising: N voltage transfer circuits (where N is a positive integer) each including a first a first MOS transistor of a first channel type having a drain terminal connected to a first node, a source terminal connected to a second node, and a gate terminal, a second MOS transistor of the first channel type having a source terminal connected to the second node, a drain terminal connected to the gate terminal of the first MOS transistor, and a gate terminal connected to a third node, and a third MOS transistor of a second channel type having a drain terminal connected to a fourth node connecting the drain terminal of the second MOS transistor with the gate terminal of the first MOS transistor, a source terminal connected to a fifth node supplied with a reference voltage, and a gate terminal connected to the third node, the N voltage transfer circuits being longitudinally connected with each other in multiple stages such that the second node of the voltage transfer circuit in each stage of the multiple stages is connected to the first node of the voltage transfer circuit in a successive stage and that the fourth node of the voltage transfer circuit in each stage of the multiple stages is connected to the third node of the voltage transfer circuit in a successive stage; and (N−1) capacitors each having first and second ends, wherein the first node of the voltage transfer circuit in a front end stage of the multiple stages is supplied with a power source voltage, and the third node of the voltage transfer circuit in the front end stage is supplied with a clock signal, the first ends of the (N−1) capacitors are respectively connected to connection nodes between the first nodes and the second nodes of the voltage transfer circuits, the second ends of the (N−1) capacitors having the first ends connected to the second nodes of the second voltage transfer circuits in odd-numbered stages among the N second voltage transfer circuits are supplied with a second clock signal having an inverse phase of the first clock signal, while the second ends of the (N−1) capacitors having the first ends connected to the second nodes of the second voltage transfer circuits in even-numbered stages are supplied with the first clock signal, and a boosted voltage is outputted from the second node of the voltage transfer circuit in a last stage of the multiple stages.

According to fifth aspect of the present invention relating to a booster circuit, there is provided a booster circuit comprising: a first voltage transfer circuit including a first a first MOS transistor of a first channel type having a drain terminal connected to a first node, a source terminal connected to a second node, and a gate terminal, a second MOS transistor of the first channel type having a source terminal connected to the second node, a drain terminal connected to the gate terminal of the first MOS transistor, and a gate terminal connected to a third node, and a third MOS transistor of a second channel type having a drain terminal connected to the drain terminal of the second MOS transistor, a source terminal connected to a fourth node supplied with a reference voltage, and a gate terminal connected to the third node; N second voltage transfer circuits (where N is a positive integer) each including a fourth MOS transistor of the first channel type having a drain terminal connected to a fifth node, a source terminal connected to a sixth node, and a gate terminal, a fifth MOS transistor of the first channel type having a source terminal connected to the sixth node, a drain terminal connected to the gate terminal of the fourth MOS transistor, and a gate terminal connected to the fifth node, and a sixth MOS transistor of the second channel type having a drain terminal connected to the drain terminal of the fifth MOS transistor, a source a terminal connected to a seventh node, and a gate terminal connected to the fifth node; and N capacitors having first and second ends, wherein the N second voltage transfer circuits are longitudinally connected with each other in multiple stages such that the sixth node in each stage is connected to the fifth node in a successive stage, that the fifth node of the second voltage transfer circuit in a front end stage of the multiple stages is connected to the second node of the first voltage transfer circuit, and that a boosted voltage is outputted from the sixth node of the second voltage transfer circuit in a last stage of the multiple stages, the seventh nodes of the N second voltage transfer circuits longitudinally connected with each other in multiple stages are respectively connected to the first node of the first voltage transfer circuit and the fifth nodes of the second voltage transfer circuits in preceding stages, the first ends of the N capacitors are respectively connected to a connection node between the second node of the first voltage transfer circuit and the fifth node of the second voltage transfer circuit in the front end stage, and connection nodes each between the sixth node of the second voltage transfer circuit in preceding one of adjacent two of the multiple stages and the fifth node of the second voltage transfer circuit in successive one of the adjacent two of the multiple stages, the first node of the first voltage transfer circuit is supplied with a power source voltage, the third node of the first voltage transfer circuit is supplied with a first clock signal, and the second ends of the capacitors having the first ends connected to the fifth nodes of the second voltage transfer circuits in odd-numbered stages of the multiple stages among the N second voltage transfer circuits are supplied with a second clock signal having an inverse phase of the first clock signal, while the second ends of the capacitors having the first ends connected to the fifth nodes of the second voltage transfer circuits in even-numbered stages are supplied with the first clock signal.

According to a sixth aspect of the present invention relating to a booster circuit, there is provided a booster circuit comprising: a first node supplied with a power source voltage; a first MOS transistor of a first channel type having a drain terminal connected to the first node, a source terminal connected to a second node, and a gate terminal; a second MOS transistor of the first channel type having a source terminal connected to the second node, a drain terminal connected to the gate terminal of the first MOS transistor, and a gate terminal connected to a first clock terminal supplied with a first clock signal; a third MOS transistor of a second channel type having a drain terminal connected to the drain terminal of the second MOS transistor, a source terminal connected to a third node supplied with a reference voltage, and a gate terminal connected to the first clock terminal; a fourth MOS transistor of the first channel type having a drain terminal connected to the first node, and a source terminal connected to a fourth node; a fifth MOS transistor of the first channel type having a source terminal connected to the fourth node, a drain terminal connected to the gate terminal of the fourth MOS transistor, and a gate terminal connected to a second clock terminal supplied with a second clock signal having an inverse phase of the first clock signal; a sixth MOS transistor of the second channel type having a drain terminal connected to the drain terminal of the fifth MOS transistor, a source terminal connected to the third node, and a gate terminal connected to the second clock terminal; a first capacitor connected between the second node and the second clock terminal; a second capacitor connected between the fourth node and the first clock terminal; a seventh MOS transistor of the first channel type having a drain terminal connected to the second node, a source terminal connected to a fifth node through which a boosted voltage is obtained, and a gate terminal connected to the fourth node; and an eighth MOS transistor of the first channel type having a drain terminal connected to the fourth node, a source terminal connected to the fifth node, and a gate terminal connected to the second node.

According to a seventh aspect of the present invention relating to a booster circuit, there is provided a booster circuit comprising: a switch circuit having an input terminal, an output terminal, and a control terminal; a control circuit for controlling the control terminal of the switch circuit, based on a first clock signal, thereby to render the switch circuit cyclically conductive, and for transfer a signal from the output terminal of the switch circuit to the control terminal, to render the switch circuit cyclically non-conductive; and a capacitor having a first end connected to the output terminal of the switch circuit and a second end supplied with a second clock signal having an inverse phase of the first clock signal, for changing a voltage of a signal from the output terminal of the switch circuit, in accordance with a change of a signal voltage of the second clock signal supplied to the second end, when the switch circuit is rendered non-conductive under control by the control circuit.

Preferred embodiments of the booster circuits according to the first to seventh aspects of the present invention will be described below.

(1) The first to third (or sixth, or eighth) MOS transistors have back gate terminals respectively connected to the source terminals of their own.

(2) The power source voltage is a voltage of a positive polarity, the MOS transistors of the first channel type are P-channel type MOS transistors, and the MOS transistors of the second channel type are N-channel type MOS transistors.

(3) The power source voltage is a ground voltage, the MOS transistors of the first channel type are N-channel type MOS transistors, and the MOS transistors of the second channel type are P-channel type MOS transistors.

According to a first aspect of the present invention relating to an IC card, there is provided an IC card comprising a power source terminal externally supplied with a power source voltage from a battery, a booster circuit for boosting the power source voltage supplied to the power source terminal, and a memory circuit capable of programming data, which operates based on the power source voltage when normally reading data and which performs a data programming operation with use of a boosted voltage outputted from the booster circuit when programming data, wherein the booster circuit is a booster circuit according to the second aspect described above.

According to a second aspect of the present invention relating to an IC card, there is provided an IC card comprising a power source terminal externally supplied with a power source voltage from a battery, a booster circuit for boosting the power source voltage supplied to the power source terminal, and a memory circuit capable of programming data, which operates based on the power source voltage when normally reading data and which performs a data programming operation with use of a boosted voltage outputted from the booster circuit when programming data, wherein the booster circuit is a booster circuit according to the third aspect described above.

According to a third aspect of the present invention relating to an IC card, there is provided an IC card comprising a power source terminal externally supplied with a power source voltage from a battery, a booster circuit for boosting the power source voltage supplied to the power source terminal, and a memory circuit capable of programming data, which operates based on the power source voltage when normally reading data and which performs a data programming operation with use of a boosted voltage outputted from the booster circuit when programming data, wherein the booster circuit is a booster circuit according to the sixth aspect described above.

According to a fourth aspect of the present invention relating to an IC card, there is provided an IC card comprising a power source terminal externally supplied with a power source voltage from a battery, a booster circuit for boosting the power source voltage supplied to the power source terminal, and a memory circuit capable of programming data, which operates based on the power source voltage when normally reading data and which performs a data programming operation with use of a boosted voltage outputted from the booster circuit when programming data, wherein the booster circuit is a booster circuit according to the seventh aspect described above.

The same preferred embodiments as described before with reference to a booster circuit are applied to the aspects of the present invention relating to an IC card.

Thus, according to the present invention having a structure as described above, there is provided a booster circuit with a high boosting efficiency. In addition, since current consumption can be reduced by internally incorporating a booster circuit according to the present invention, it is possible to enhance life-time of a battery in case of battery driving.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

In the following, the present invention will be explained with reference to the drawings.

Figure 5:
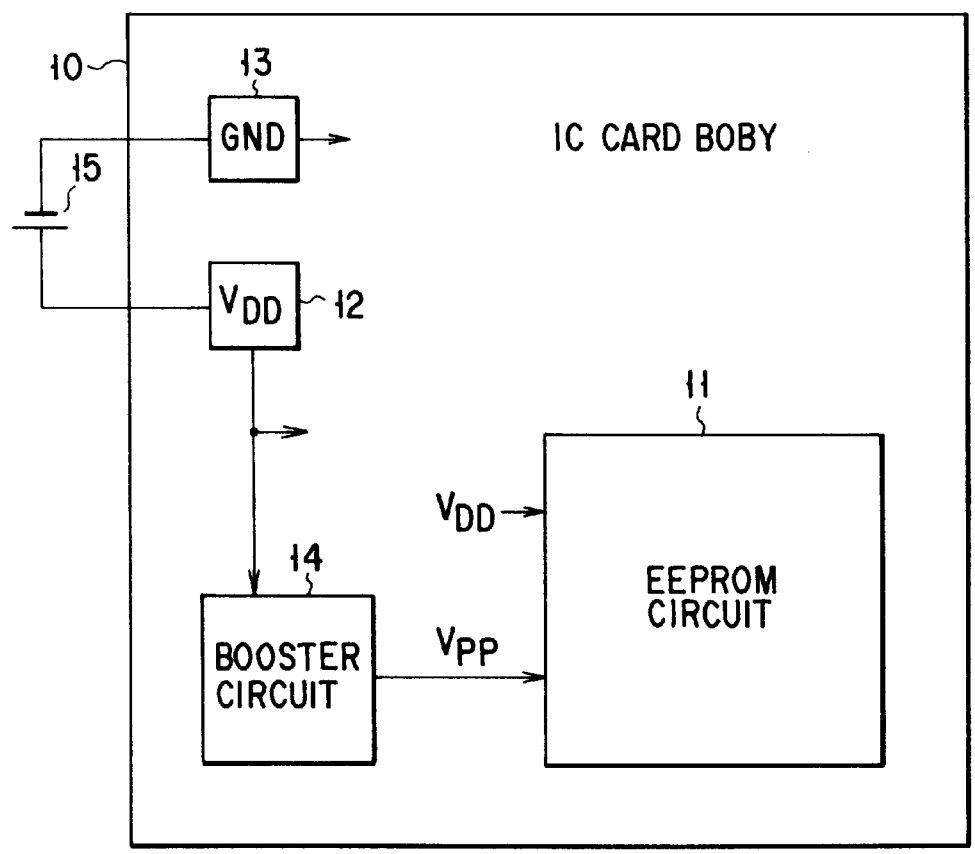
FIG. 5 is a block diagram showing a schematic structure of an IC memory card (or IC card) including a booster circuit according to the present invention.

FIG. 5 is a block diagram showing a schematic structure of an IC memory card (or IC card) including a booster circuit according to the present invention. An IC card body 10 is provided with an EEPROM circuit 11 including an EEPROM cell array and peripheral circuits thereof, a power source terminal 12, a ground terminal 13, and a booster circuit 14 for boosting a power source voltage VDD supplied to the power source terminal 12 to output a boosted voltage VPP.

The EEPROM circuit 11 operates on the basis of the power source voltage VDD supplied to the power source terminal 12 when normally reading data, and executes programming operation concerning data with use of a boosted voltage VPP outputted from the booster circuit when programming data. Note that the power source terminal 12 and the ground terminal 13 are connected with a battery 15.

Figure 6:
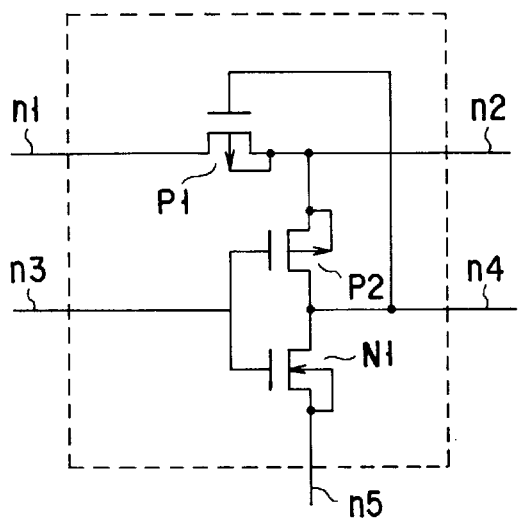
FIG. 6 is a circuit diagram showing another example of a voltage transfer circuit used in the booster circuit shown in FIG. 5.
Figure 7:
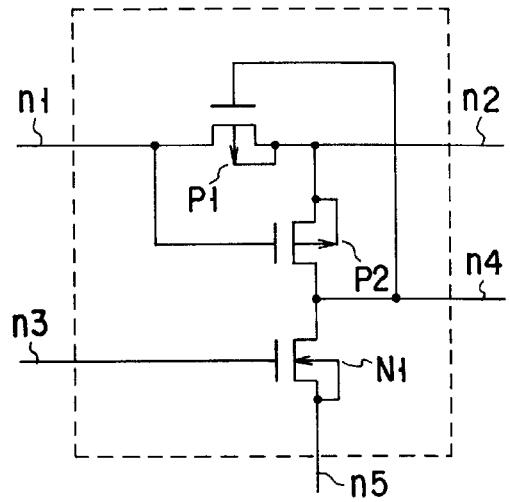
FIG. 7 is a circuit diagram showing another example of a voltage transfer circuit used in the booster circuit shown in FIG. 5.

FIGS. 6 and 7 respectively show examples of a voltage transfer circuit used in the booster circuit shown in FIG. 5.

The voltage transfer circuit shown in FIG. 6 comprises two P-channel MOS transistor (which will be referred to as only PMOS transistors hereinafter) P1 and P2, an N-channel MOS transistor (which will be referred to as only an NMOS transistor hereinafter) N1. The PMOS transistor P1 has a drain terminal connected with a node n1 supplied with a predetermined voltage, and a source terminal connected with a node n2. The PMOS transistor P2 has a source terminal connected with the node n2, a drain terminal connected with a gate terminal of the PMOS transistor P1, and a gate terminal connected with a node n3. The NMOS transistor N1 has a drain terminal connected with a node n4 commonly connected with the drain terminal of the PMOS transistor P2 and the gate terminal of the PMOS transistor P1, a gate terminal connected to the node n3, and a source terminal connected with a node n5. Further, each of the PMOS and NMOS transistors has a back gate terminal connected to its own source terminal.

Suppose that the node n1 is supplied with a voltage of a positive voltage, that the node n3 commonly connected with the gate terminal of the PMOS transistor P2 and the gate terminal of the NMOS transistor N1 is supplied with a clock signal, and that the node n5 is supplied with a ground voltage (GND).

When the clock signal is of a logic 1 level, the NMOS transistor N1 is turned on while the PMOS transistor P2 is turned off. In this state, the ground voltage is transferred to the gate terminal of the PMOS transistor P1 through the NMOS transistor N1 turned on, so that the PMOS transistor P1 is turned on. The voltage of a positive polarity supplied to the node n1 is directly transferred to the node n2. In this state, the voltage does not decrease.

Meanwhile, when the clock signal goes to a logic 0 level, the NMOS transistor N1 is turned off and the PMOS transistor P2 is turned on. In this state, the voltage of the node n2 is supplied to the gate terminal of the PMOS transistor P1 through the PMOS transistor turned on. In this state, the gate terminal and the source terminal of the PMOS transistor P1 have an equal voltage, so that the PMOS transistor P1 is turned off.

Thus, in a voltage transfer circuit shown in FIG. 6, the voltage supplied to the node n1 can be transferred to the node 2n without the voltage drop.

A voltage transfer circuit shown in FIG. 7 consists of two PMOS transistors P3 and P4 and an NMOS transistor N2. The voltage transfer circuit shown in FIG. 7 differs from that shown in FIG. 6 in that the gate terminal of the PMOS transistor P2 is not connected to the node n3 but is connected to the node n1.

Suppose that the node n1 is supplied with a voltage of a positive polarity, that the node n3 is supplied with a clock signal, and that the node n5 is supplied with a ground voltage, like in the former case.

When the clock signal is of a logic 1 level, the NMOS transistor N1 is turned on. In this state, the ground voltage is transferred to the gate terminal of the PMOS transistor P1 through the NMOS transistor N1 turned on, so that the PMOS transistor is turned on. Therefore, the voltage of a positive polarity supplied to the node n1 is directly transferred to the node n2. Here, the voltage does not decrease.

On the other hand, when the clock signal goes to a logic 0 level, the NMOS transistor N1 is turned off. In this state, since the voltage of the node n2 has already been equal to the voltage of the node n1, the gate terminal and the source terminal of the PMOS transistor P2 have an equal electric potential, so that the PMOS transistor P2 is turned off and the gate terminal of the PMOS transistor P1 is brought into a floating state. Therefore, the PMOS transistor P1 is turned off.

Thus, also in the voltage transfer circuit shown in FIG. 7, the voltage supplied to the node n1 can be transferred to the node n2 without the voltage drop.

Figure 8:
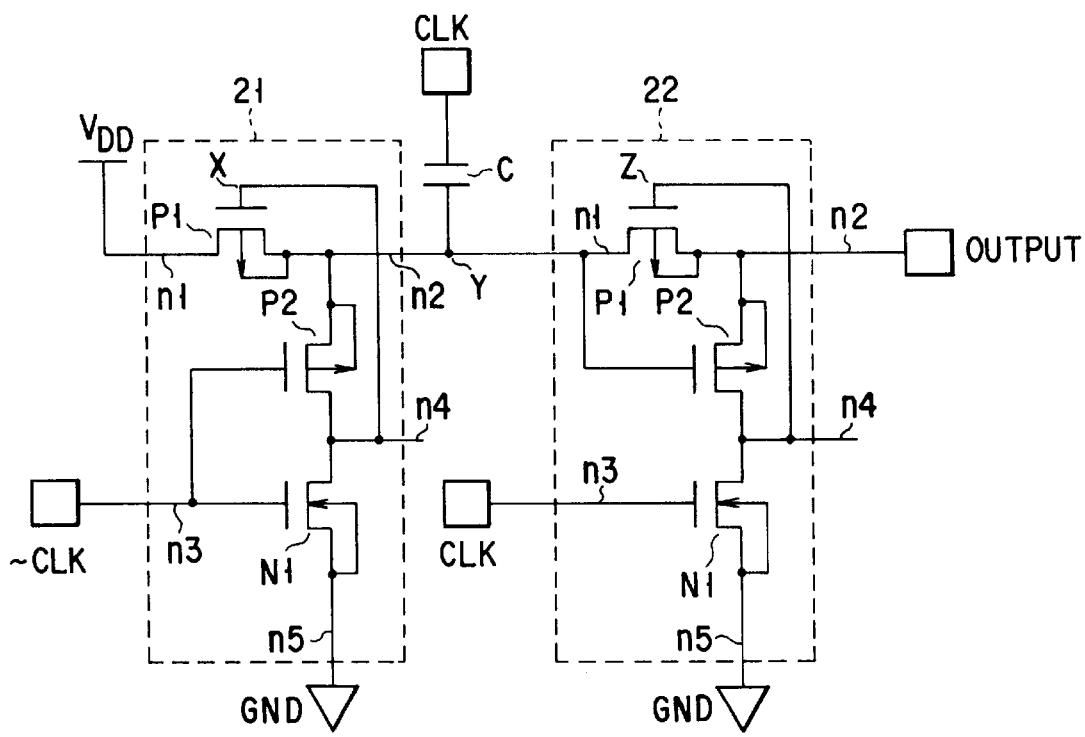
FIG. 8 shows a specific circuit diagram according to a first embodiment of a booster circuit of the present invention.

FIG. 8 shows a specific circuit diagram according to a first embodiment of the booster circuit shown in FIG. 5. This booster circuit serves to boost twice the power source voltage VDD supplied from the battery 15 shown in FIG. 5, and consists of a combination of a voltage transfer circuit 21 shown in FIG. 6, a voltage transfer circuit 22 shown in FIG. 7, and a capacitor C.

A node n1 of the voltage transfer circuit 21 is connected to a power source voltage VDD, and a node n3 thereof is supplied with a clock signal /CLK (which denotes a signal having an inverted phase of a clock signal CLK). A node n3 of the other voltage transfer circuit 22 is supplied with a clock signal CLK.

A node N1 of another voltage transfer circuit 22 is connected to the node n2 of one of the voltage transfer circuit 21. The4 boosted voltage is output from the node n2 of the voltage transfer circuit. A clock signal CLK is supplied to the node n3 of another voltage transfer circuit 22. The nodes n5 of the voltage transfer circuits 21 and 22 are commonly connected to a ground potential GND.

Figure 9:
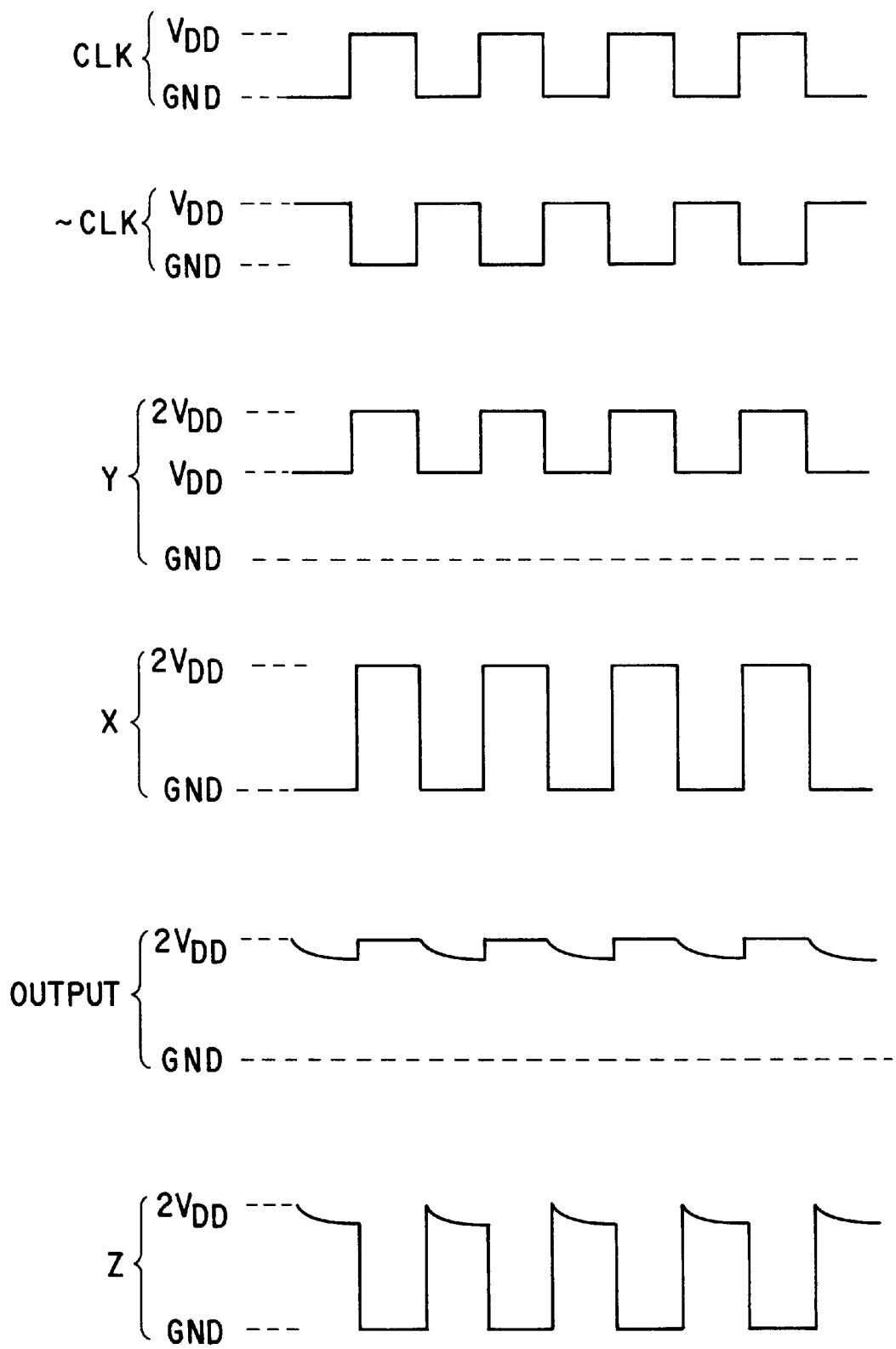
FIG. 9 is a waveform chart showing an example of operation of the booster circuit shown in FIG. 8.

Operation of the booster circuit constructed as described above will be explained next with reference to a waveform chart shown in FIG. 9. Note that X, Y, and Z respectively represent signals at the node of the gate terminal of a PMOS transistor P1, at the node of a terminal of the capacitor C, and at the node of the gate terminal of a PMOS transistor P3.

Firstly, where the clock signal CLK is of a logic 0 level (GND) and the clock signal /CLK is of a logic 1 level (VDD), a PMOS transistor P2 is turned off and an NMOS transistor N1 is turned on in the voltage transfer circuit 21. Since the NMOS transistor N1 is turned on, the signal X at the gate terminal of the PMOS transistor P1 goes to a GND level, so that the PMOS transistor P1 is turned on. Therefore, the signal Y at the node of a terminal of the capacitor C goes to a VDD level.

In the other voltage transfer circuit 22, the gate terminal of the PMOS transistor P2 is changed to a VDD level by a signal Y. In this state, if the output terminal of the boosted voltage is of a level higher than VDD, the PMOS transistor P2 is turned on. In addition, since the NMOS transistor N1 whose gate terminal is supplied with a clock signal CLK is turned off, a level higher than VDD is supplied to the gate terminal of the PMOS transistor P1 from the output terminal of the boosted voltage through the PMOS transistor P2 turned on. Therefore, the PMOS transistor P1 is turned off. If the output terminal of the boosted voltage is of a level lower than VDD, the PMOS transistor P2 is turned off and the gate terminal of the PMOS transistor P1 is thereby electrically floated, so that the PMOS transistor P1 is turned off, likewise.

When the clock signal CLK next goes to a logic 1 level and the clock signal /CLK goes to a logic 0 level from this state, the PMOS transistor P2 is turned on and the NMOS transistor N1 is turned off in the voltage transfer circuit 21. As a result of this, the gate terminal of the PMOS transistor P1 is supplied with a VDD level of a signal Y through the PMOS transistor P2 turned on. Consequently, the source terminal and the gate terminal of the PMOS transistor P1 have an equal level, so that the PMOS transistor P1 is turned off. At the same time, since the clock signal CLK thus changes to a logic 1 level, the signal Y at the node of a terminal of the capacitor C increases to a level of VDD+ VDD from a level of VDD, i.e., the voltage is boosted to 2 VDD. In addition, the level of the gate terminal of the PMOS transistor P1 increases in accordance with the increase of the terminal of the capacitor C, and therefore, the PMOS transistor P1 is turned off.

In the other voltage transfer circuit 22, the NMOS transistor N1 is turned on since the clock signal CLK has changed to a logic 1 level as described above. In addition, since the signal Y has been boosted to 2 VDD, the PMOS transistor P2 is turned off. As a result of this, the ground voltage is supplied to the gate terminal of the PMOS transistor P1, and the PMOS transistor P1 is turned on. When the PMOS transistor P1 is thus turned on, the signal Y boosted to 2 VDD is transferred to the output terminal of the boosted voltage.

Further, when the clock signal CLK goes to a logic 0 level and the clock signal /CLK goes to a logic 1 level, the circuit returns to the initial state and the PMOS transistor P1 in the other voltage transfer circuit 22 is turned off. Therefore, the level of 2 VDD of the output terminal of the boosted voltage is maintained without changes.

Figure 1:
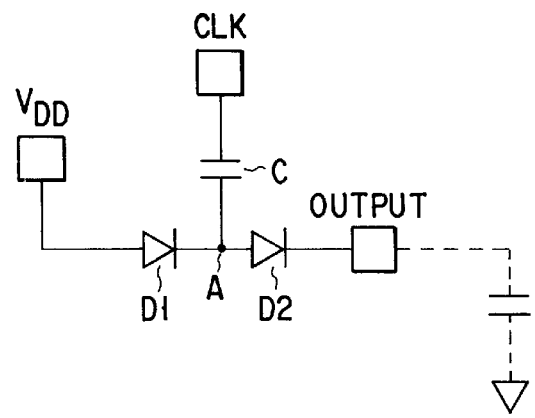
FIG. 1 is a circuit diagram showing a conventional booster circuit consisting of a capacitor and a diode element.
Figure 2:
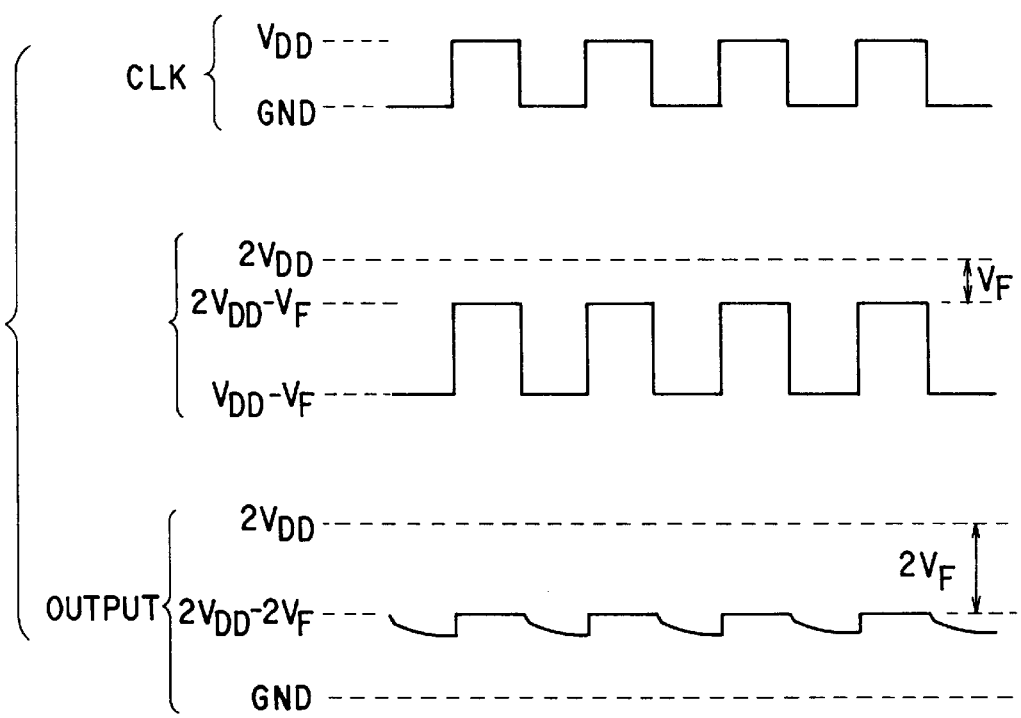
FIG. 2 is a waveform chart of the booster circuit shown in FIG. 1.
Figure 3:
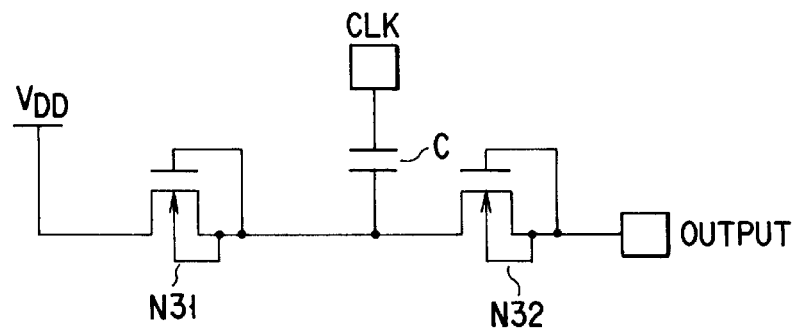
FIG. 3 is a circuit diagram showing another conventional booster circuit.
Figure 4:
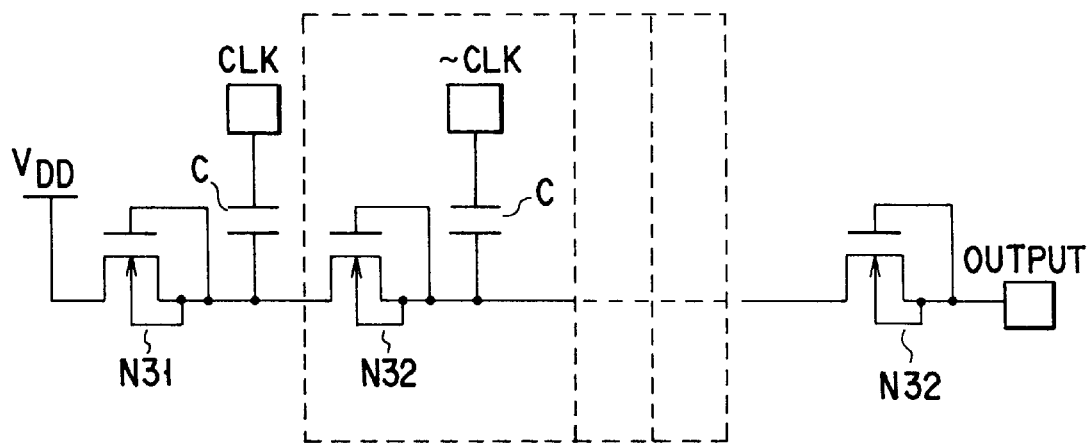
FIG. 4 is a circuit diagram of a conventional booster circuit in which conventional circuit each shown in FIG. 3 are cascade-connected in multiple stages.

As has been explained above, in the booster circuit according to the first embodiment, a boosted voltage twice higher than the power source voltage VDD without a decrease in the forward voltage component of a diode in a conventional circuit as shown in FIG. 1 or a decrease in the threshold voltage component of an NMOS transistor in a conventional circuit as shown in FIGS. 3 and 4. However, the operation described above applies to an ideal case, i.e., a case in which a parasitic output leakage current can be ignored. In practice, a leakage current path exists at an output terminal of a boosted voltage. Therefore, when the clock signal CLK is of a logic 0 level, a leakage current occurs from an output capacitance (not shown) and electric charges move, so that the voltage at the output terminal of the boosted voltage gradually decreases from 2 VDD. This decrease in voltage is recovered to 2 VDD when the clock signal CLK next rises to a logic 1 level.

Figure 10:
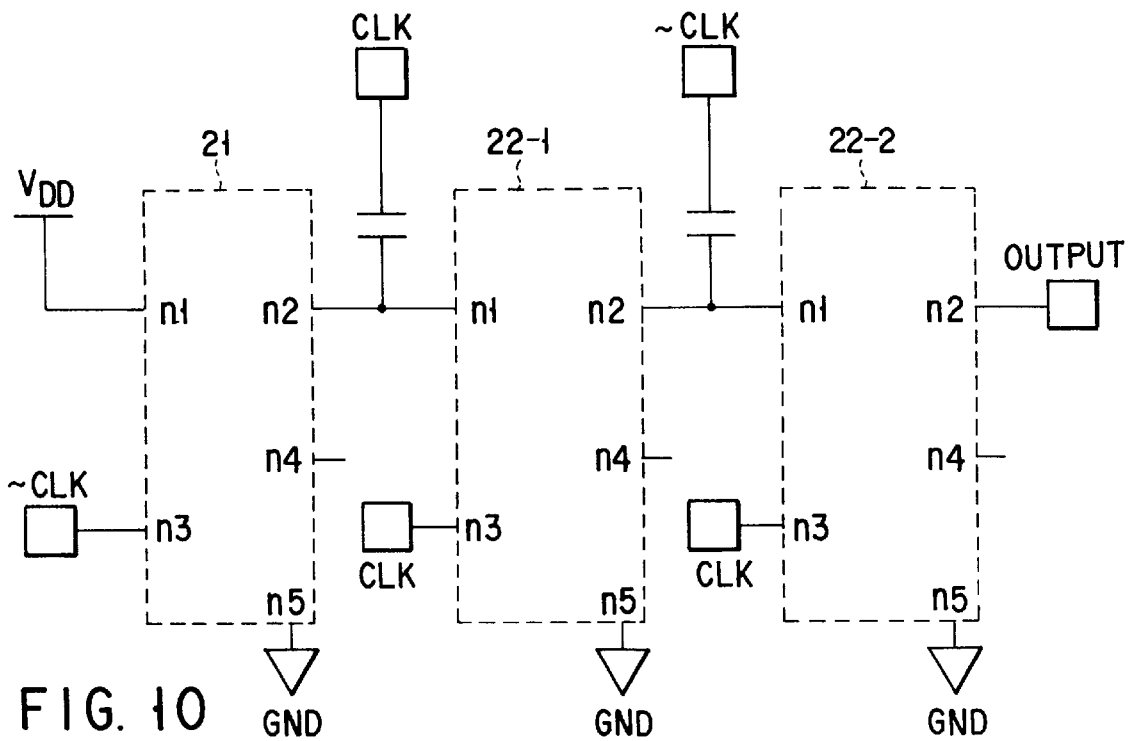
FIG. 10 shows a specific circuit diagram according to a second embodiment of a booster circuit of the present invention.

FIG. 10 shows a specific circuit diagram according to a second embodiment in which the embodiment shown in FIG. 8 is enhanced and the present invention is practically applied to a booster circuit for boosting three times a power source voltage VDD.

The booster circuit is constituted by a combination of a voltage transfer circuit 21 shown in FIG. 6, two voltage transfer circuits 22-1 and 22-2 each shown in FIG. 7, and two capacitors C1 and C2.

A node n1 of the voltage transfer circuit 21 is connected to a power source voltage VDD and a node n3 thereof is supplied with a clock signal /CLK. In addition, a node n2 thereof is connected to a terminal of the capacitor C1. The other terminal of the capacitor C1 is supplied with a clock signal CLK.

The two voltage transfer circuits 22-1 and 22-2 described above are longitudinally connected with each other in multiple stages, such that a node n2 in a front stage is connected to a node n1 in a rear stage. The node n1 of the voltage transfer circuit 22-1 in the front stage is connected to the node n2 of the other voltage transfer circuit 22-2. In addition, the node n3 of the voltage transfer circuit 22-1 in the front stage is supplied with a clock signal CLK, and the node n3 of the voltage transfer circuit 22-2 in the rear stage is supplied with a clock signal /CLK. A connection node between the node n2 of the voltage transfer circuit 22-1 in the front stage and the node n1 of the voltage transfer circuit 22-2 in the rear stage is connected with a terminal of the other capacitor C2, and the other terminal of the capacitor C2 is supplied with a clock signal /CLK.

According to the present embodiment which is constructed by adding a voltage transfer circuit 22-2 and a capacitor C2 to the embodiment shown in FIG. 8, a voltage boosted to 2 VDD without any other decrease in voltage than that caused by a leakage current can be obtained at the connection node between the node n2 of the voltage transfer circuit 22-1 in the front stage and the node n1 of the voltage transfer circuit in the rear stage, like in the case shown in FIG. 8. Further, since the present embodiment is added with the voltage transfer circuit 22-2 and the capacitor C2, a voltage boosted to 3 VDD is obtained at the output terminal.

Although the present embodiment has been explained with reference to a case in which two voltage transfer circuits 22-1 and 22-2 and two capacitors C1 and C2 are provided in addition to the voltage transfer circuit 21 to obtain a boosted voltage three times higher than a power source voltage, a boosted voltage N times higher than a power source voltage can be obtained if N voltage transfer circuits 22 and N capacitors are provided in addition to the voltage transfer circuit 21 (where N is a positive integer greater than 2). In this case, N voltage transfer circuits 22 are longitudinally connected to each other in multiple stages such that a node n2 in a stage is connected to a node n1 in a successive stage, and terminals of N capacitors, in one end of each capacitor, are respectively connected to the nodes n1 of voltage transfer circuits 22.

Further, a node n3 of the voltage transfer circuit 21 is supplied with a clock signal /CLK. In N voltage transfer circuits 22 longitudinally connected with each other in multiple stages, nodes n3 of voltage transfer circuits 22 in odd-numbered stages including the front end stage are supplied with a clock signal CLK while nodes n3 of voltage transfer circuits 22 in even-numbered stages are supplied with a clock signal /CLK.

In N capacitors, the other terminals of those capacitors which have terminals connected to the nodes n1 of the voltage transfer circuits 22 in the odd-numbered stages are supplied with a clock signal CLK, while the other terminals of those capacitors which have terminals connected to the nodes n1 of the voltage transfer circuits 22 in the even-numbered stages are supplied with a clock signal /CLK.

Now, the conventional circuit shown in FIG. 4 will be compared with the circuit according to the present embodiment described above and shown in FIG. 10, where a boosted voltage as ten times high as a power source voltage VDD is obtained. In this case, the conventional circuit shown in FIG. 4 requires two stages due to its low voltage efficiency, while the present embodiment requires only ten stages which is the half of the conventional circuit. It is well-known that capacitors occupy the largest area in an integrated circuit. Twenty stages require as many as ninety capacitors while ten stages require only nine capacitors. As a result, the chip area can be greatly reduced. Further, a capacitor is a component which consumes the largest current in a booster circuit. However, since the number of capacitors used is small as described above, the entire current consumption is greatly reduced.

Figure 11:
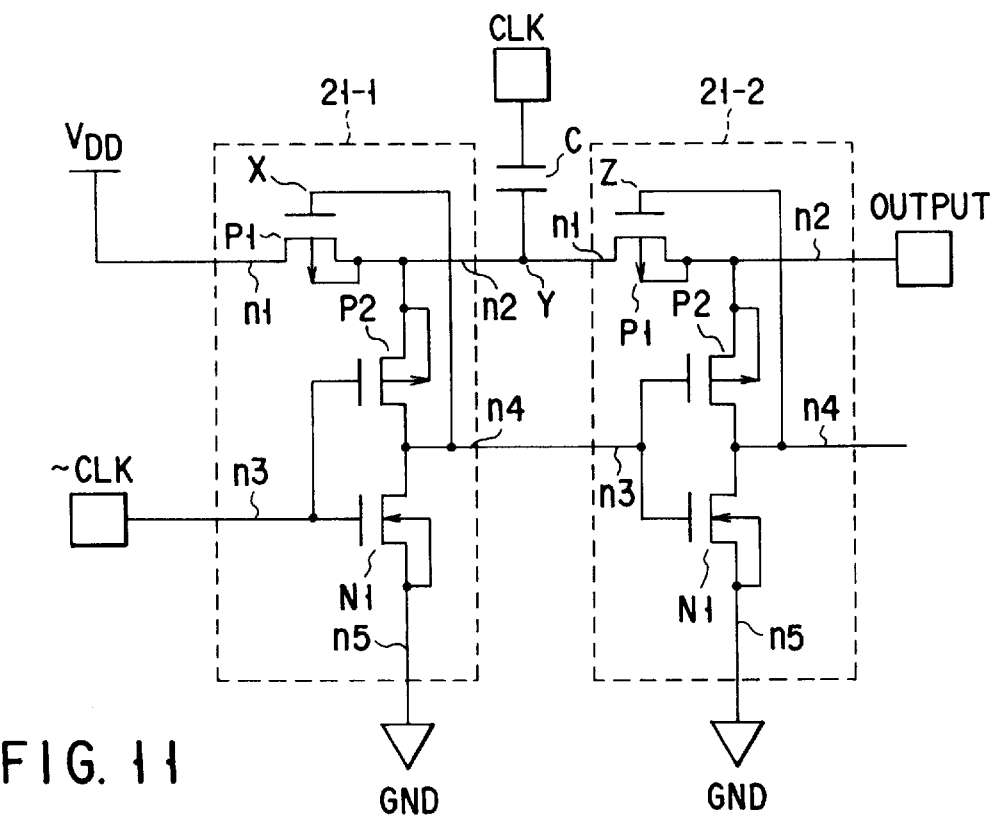
FIG. 11 shows a specific circuit diagram according to a third embodiment of a booster circuit of the present invention.

FIG. 11 shows a specific circuit diagram according to a third embodiment of a booster circuit provided in FIG. 5. The booster circuit serves to boost twice a power source voltage VDD supplied from a battery 15 shown in FIG. 5, and is constructed by a combination of two voltage transfer circuits 21-1 and 21-2 each shown in FIG. 6 and a capacitor C.

The voltage transfer circuit 21-1 has a node n1 connected to a power source voltage VDD, a node n3 supplied with a clock signal /CLK, and a node n2 connected to a terminal of the capacitor C. The other terminal of the capacitor C is supplied with a clock signal CLK.

The other voltage transfer circuit 21-2 has a node n1 connected to the node n2 of the voltage transfer circuit 21-1. A boosted voltage is outputted from the node n2 of the voltage transfer circuit 22-2. The voltage transfer circuit 22-2 has a node n3 connected to a node n4 of the voltage transfer circuit 22-1. Note that nodes n5 of both the voltage transfer circuits 21-1 and 21-2 are commonly connected to a ground voltage GND.

The booster circuit constructed as described above differs from that shown in FIG. 8 only in that a gate terminal of a PMOS transistor P2 and a gate terminal of an NMOS transistor N1 of the voltage transfer circuit 21-2 are commonly connected to the node n3 thereof and this node n3 is connected to the node n4 of the voltage transfer circuit 21-1. Operation of this embodiment will therefore be explained only on the basis of the difference.

In case of FIG. 8, conductance of the NMOS transistor N1 of the voltage transfer circuit 22 is controlled by a clock signal CLK itself. However, in the present embodiment, the conductance of the NMOS transistor N1 in the voltage transfer circuit 21-2 is controlled by a ground voltage passing through the NMOS transistor N1 in the voltage transfer circuit 21-1 or a signal Y passing through the PMOS transistor P2 in the voltage transfer circuit 21-1.

When the clock signal CLK is of a logic 0 level, the NMOS transistor N1 of the voltage transfer circuit 22 shown in FIG. 8 is turned off. In this state, the clock signal /CLK supplied to the gate terminal of the NMOS transistor N1 of the voltage transfer circuit 21-1 shown in FIG. 10 is of a logic 1 level, so that the NMOS transistor N1 is turned on and the node n4 of the voltage transfer circuit 21-1 is set to a ground voltage. The NMOS transistor N1 of the voltage transfer circuit 21-2 is therefore turned off.

On the other side, the NMOS transistor N1 of the voltage transfer circuit 22 shown in FIG. 8 is turned on when the clock signal CLK is of a logic 1 level. In this state, the signal Y is boosted to 2 VDD and this boosted voltage is transferred to the node n4 through the PMOS transistor P2 in the voltage transfer circuit 21-1 shown in FIG. 10, so that the NMOS transistor N1 in the voltage transfer circuit 21-1 is turned off.

The PMOS transistor P2 of the voltage transfer circuit 22 is turned off when the clock signal CLK is of a logic 1 level. In this state, the clock signal /CLK supplied to the node n3 of the voltage transfer circuit 21-1 shown in FIG. 10 is of a logic 0 level, so that the PMOS transistor P2 is turned on. Therefore, the signal Y boosted to 2 VDD is transferred to the node n4 through the PMOS transistor P2 in the voltage transfer circuit 21-1. Therefore, the gate and source terminals of the PMOS transistor P2 in the voltage transfer circuit 21-2 have an equal potential and the PMOS transistor P2 in the voltage transfer circuit 21-2 is turned off.

On the other side, the PMOS transistor P2 of the voltage transfer circuit 22 shown in FIG. 8 is turned on when the clock signal CLK is of a logic 0 level. In this state, the clock signal /CLK supplied to the gate terminal of the NMOS transistor N1 of the voltage transfer circuit 21-1 shown in FIG. 10 is of a logic 1 level, and the NMOS transistor N1 is turned on. Therefore, so that the node n4 of the voltage transfer circuit 21-1 is set to a ground potential. Therefore, the PMOS transistor P2 of the voltage transfer circuit 21-2 is turned on.

According to the present embodiment, like in the booster circuit of the first embodiment shown in FIG. 8, a boosted voltage twice higher than the power source voltage VDD is obtained without decreasing the forward voltage component of a diode or the threshold voltage component of a NMOS transistor.

Figure 12:
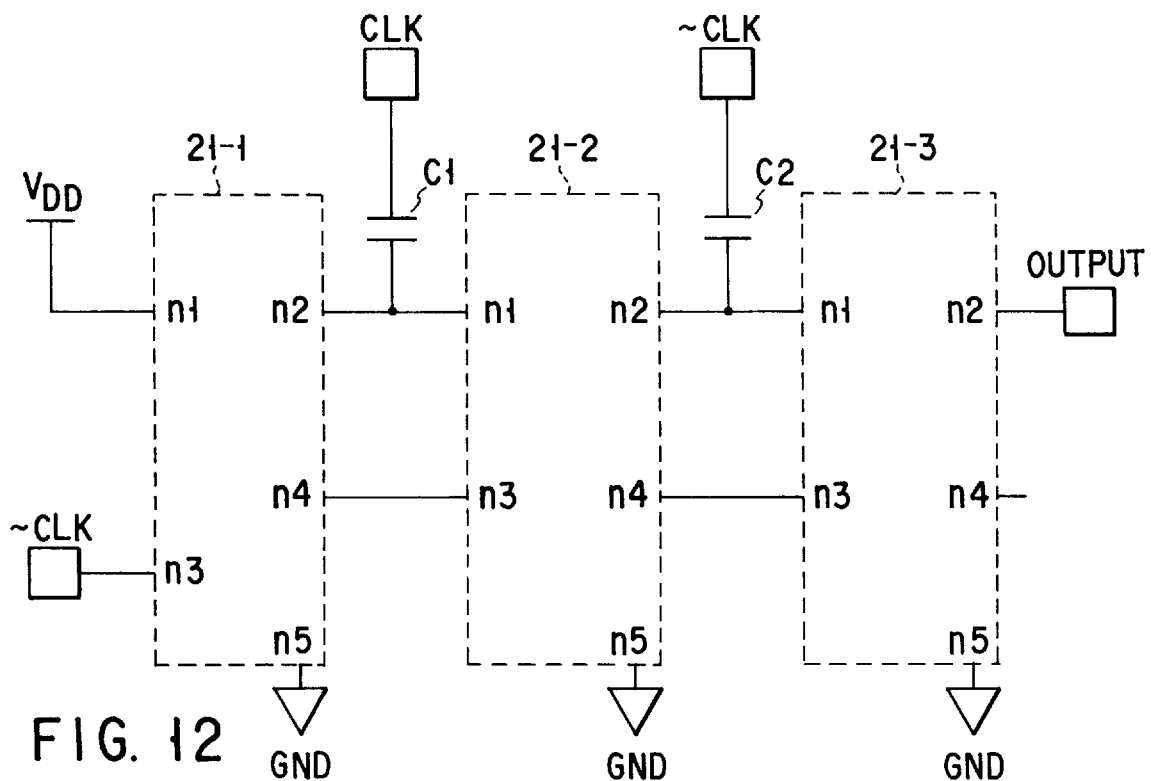
FIG. 12 shows a specific circuit diagram according to a fourth embodiment of a booster circuit of the present invention.

FIG. 12 shows a specific circuit diagram according to a fourth embodiment in which the embodiment shown in FIG. 11 is enhanced and the present invention is practically applied to a booster circuit for boosting three times a power source voltage VDD.

The booster circuit is constructed by a combination of three voltage transfer circuits 21-1, 21-2, and 21-3 each shown in FIG. 6, and two capacitors C1 and C2.

The three voltage transfer circuits 21-1, 21-2, and 21-3 are longitudinally connected with each other in multiple stages such that a node n2 in each stage is connected to a node n3 in a successive stage and a node n4 in each stage is connected to a node n3 in a successive stage. The node n1 of the voltage transfer circuit 21-1 in the front end stage is connected to a power source voltage VDD and the node n2 of the voltage transfer circuit 21-3 in the last stage is connected to an output terminal of a boosted voltage. The node n3 of the voltage transfer circuit 21-1 in the front end stage is supplied with a clock signal /CLK. Further, a terminal of the capacitor C1 is connected to a connection node between the node n2 of the voltage transfer circuit 21-1 and the node n1 of the voltage transfer circuit 21-2, and the other terminal of the capacitor C1 is supplied with a clock signal CLK. A terminal of the capacitor C2 is connected to a connection node between the node n2 of the voltage transfer circuit 21-2 and the node n1 of the voltage transfer circuit 21-3, and the other terminal of the capacitor C2 is supplied with a clock signal /CLK.

The present embodiment is constructed by adding a voltage transfer circuit 21-3 and a capacitor C2 to the embodiment shown in FIG. 11, so that a voltage boosted to 2 VDD can be obtained at the connection node between the node n2 of the voltage transfer circuit 21-2 and the node n1 of the voltage transfer circuit 21-3, without any other decrease in voltage than that caused by a leakage current, like in the case shown in FIG. 11. Further, according to the present embodiment, since a voltage transfer circuit 21-3 and a capacitor C2 are added as described above, a voltage boosted to 3 VDD is obtained at the output terminal.

Although the present embodiment has been explained with reference to a case in which three voltage transfer circuits 21-1, 21-2, and 21-3 and two capacitors C1 and C2 are provided to obtain a boosted voltage three times higher than a power source voltage, a boosted voltage N times higher than a power source voltage can be obtained if N voltage transfer circuits 21 and (N−1) capacitors are provided (where N is a positive integer greater than 2). In this case, N voltage transfer circuits 21 are longitudinally connected to each other in multiple stages such that a node n2 in each stage is connected to a node n1 in a successive stage, that a node n4 in each stage is connected to a node n3 in a successive stage, and that terminals of N capacitors, in one end of each capacitor, are respectively connected to connection nodes each connecting a node n2 of a voltage transfer circuit 21 in a stage and a node n1 of a voltage transfer circuit 21 in a successive stage.

Further, a node n3 of the voltage transfer circuit 21 in the front end stage is supplied with a clock signal /CLK. The other terminals of those of (N−1) capacitors which have terminals connected to nodes n2 of voltage transfer circuits 21 in odd-numbered stages including the front end stage are supplied with a clock signal CLK while the other terminals of those of (N−1) capacitors which have terminals connected to nodes n2 of voltage transfer circuits 22 in even-numbered stages are supplied with a clock signal /CLK.

The present embodiment also achieves a high voltage efficiency and can obtain a desired boosted voltage with a smaller number of stages (which is the number of voltage transfer circuits 21 used) than a conventional circuit, so that the chip area can be greatly reduced. In addition, the number of capacitors which are components having a largest current consumption in a booster circuit, the entire current consumption can be greatly reduced.

Figure 13:
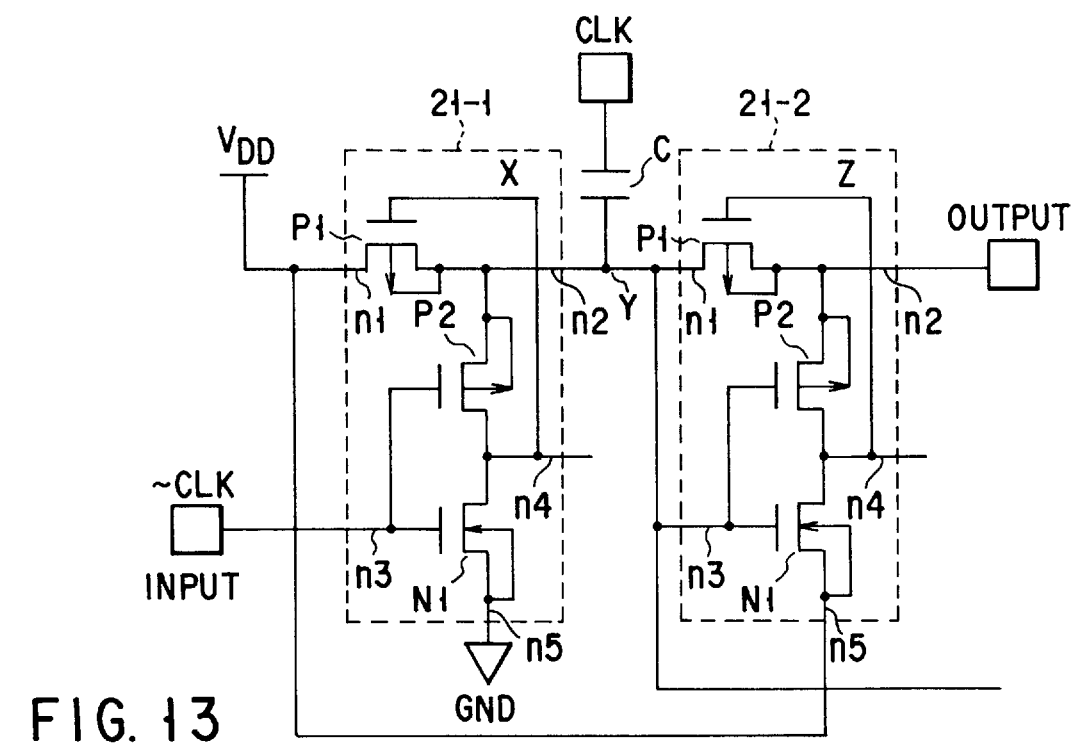
FIG. 13 shows a specific circuit diagram according to a fifth embodiment of a booster circuit of the present invention.

FIG. 13 shows a specific circuit diagram according to a fifth embodiment of a booster circuit shown in FIG. 5. The booster circuit serves to boost twice a power source voltage supplied from a battery shown in FIG. 5, and is constructed by a combination of two voltage transfer circuits 21-1 and 21-2 each shown in FIG. 5 and a capacitor C.

The booster circuit according to the present embodiment is constructed in a structure substantially similar to that shown in FIG. 11, and therefore, explanation will be made only of a difference of the present embodiment from that shown in FIG. 11. In the embodiment shown in FIG. 11, a node n3 of the voltage transfer circuit 21-2 in a rear stage is connected to a node n4 of the voltage transfer circuit 21-1 in a front stage, and a node n5 of the voltage transfer circuit 21-2 in the rear stage is connected to a ground voltage GND. However, in the booster circuit according to the present embodiment, a node n3 of the voltage transfer circuit 21-2 in the rear stage is connected to a node n1 of the same voltage transfer circuit 21-2, and a node n5 of the voltage transfer circuit 21-2 in the rear stage is connected to a node n1 of the voltage transfer circuit 21-1 in the front stage.

In the present embodiment, the clock signal CLK goes to a logic 1 level and the signal Y at a node of the capacitor C increases to 2 VDD, thereby turning on the PMOS transistor P1 in the voltage transfer circuit 21-2. When the voltage thus boosted is transferred to an output terminal, the NMOS transistor N1 in the same voltage transfer circuit 21-2 must be turned on so that the gate terminal of the PMOS transistor P1 is supplied with a voltage lower than 2 VDD by at least a value equivalent to a threshold voltage. In the circuit shown in FIG. 11, the source terminal of the NMOS transistor N1 is connected to a ground voltage and the ground voltage is supplied to the gate terminal of the PMOS transistor P1, thereby to turn on this transistor. However, in the circuit according to the present embodiment, a power source voltage VDD lower than 2 VDD is supplied to the source terminal of the NMOS transistor N1, thereby to turn on this NMOS transistor N1, so that the power source voltage VDD is supplied to the gate terminal of the PMOS transistor P1.

Figure 14:
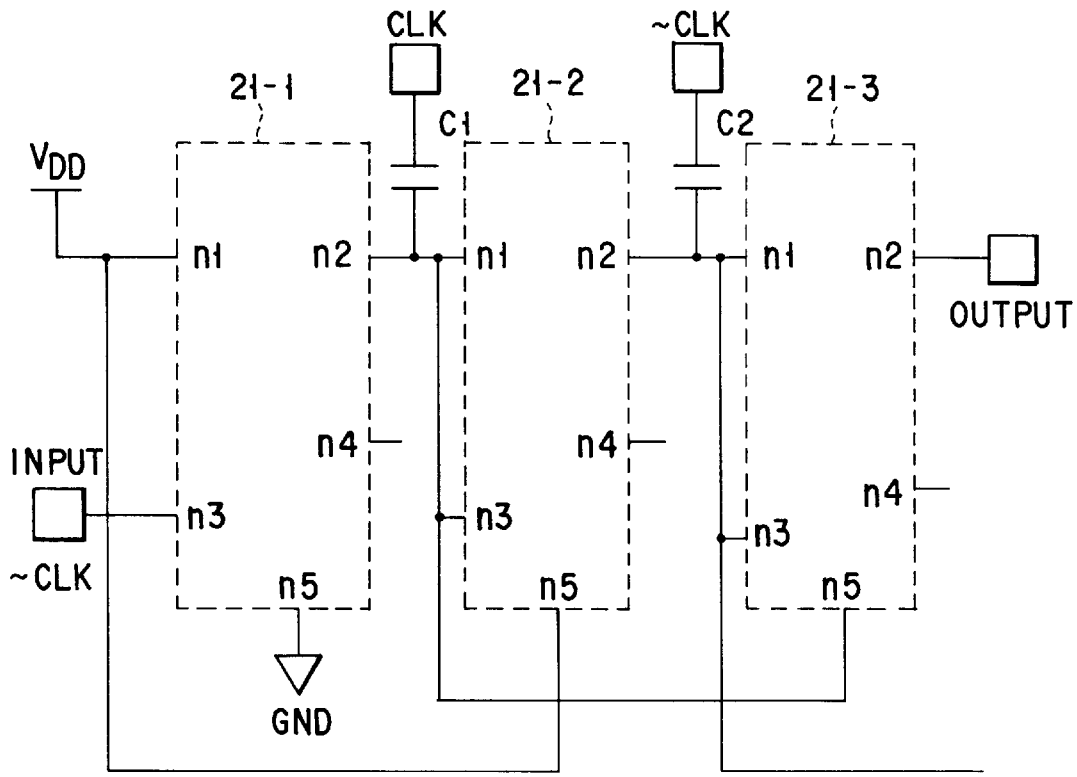
FIG. 14 shows a specific circuit diagram according to a sixth embodiment of a booster circuit of the present invention.

FIG. 14 shows a specific circuit diagram according to a sixth embodiment in which the embodiment shown in FIG. 13 is enhanced and the present invention is applied to a booster circuit for boosting three times a power source voltage VDD.

The booster circuit is constructed by a combination of three voltage transfer circuits 21-1, 21-2, and 21-3 each shown in FIG. 6 and two capacitors C1 and C2.

The three voltage transfer circuits 21-1, 21-2, and 21-3 are longitudinally connected with each other in multiple stages, such that a node n2 in each stage is connected to a node n1 in a successive stage. The node n1 of the voltage transfer circuit 21-1 in the front end stage is connected to a power source voltage VDD, and the node n2 of the voltage transfer circuit 21-3 in the last stage is connected to an output terminal of a boosted voltage. In addition, the node n2 of the voltage transfer circuit 21-1 in the front end stage is supplied with a clock signal /CLK. The node n5 of the voltage transfer circuit 21-1 in the front end stage is connected to a ground voltage. The node n5 of the voltage transfer circuit 21-2 in the second stage is connected to the node n1 of the voltage transfer circuit 21-1 in the front end stage. The node n5 of the voltage transfer circuit 21-3 in the third or last stage is connected to the node n1 of the voltage transfer circuit 21-2 in the second stage.

A terminal of the capacitor C1 is connected to a connection node between the node n2 of the voltage transfer circuit 21-1 and the node n1 of the voltage transfer circuit 21-2, and the other terminal of the capacitor C1 is supplied with a clock signal CLK. A terminal of the capacitor 2 is connected to a connection node between the node n2 of the voltage transfer circuit 21-2 and the node n1 of the voltage transfer circuit 21-3, and the other terminal of the capacitor C2 is supplied with a clock signal /CLK.

The present embodiment is constructed by adding a voltage transfer circuit 21-3 and a capacitor C2 to the embodiment shown in FIG. 13, so that a voltage boosted to 2 VDD can be obtained at the connection node between the voltage transfer circuit 21-2 and the node n1 of the voltage transfer circuit 21-3, without any other decrease in voltage than that caused by a leakage current, like in the case shown in FIG. 13. Further, since the present embodiment is thus added with a voltage transfer circuit 21-3 and a capacitor C2, a voltage boosted to be three times higher than 3 VDD can be obtained at the output terminal.

Although the present embodiment has been explained with reference to a case in which three voltage transfer circuits 21-1, 21-2, and 21-3 and two capacitors C1 and C2 are provided to obtain a boosted voltage three times higher than a power source voltage, a boosted voltage N times higher than a power source voltage can be obtained by providing N voltage transfer circuits 21 and (N−1) capacitors (where N is a positive integer). In this case, N voltage transfer circuits are longitudinally connected with each other in multiple stage such that a node n2 in each stage is connected to a node n1 in a successive stage, and that terminals of N capacitors, in one end of each capacitor, are respectively connected to connection nodes each connecting a node n2 of a voltage transfer circuit 21 in a stage with a node n1 of a voltage transfer circuit 21 in a successive stage.

Further, the node n3 of the voltage transfer circuit 21-1 in the front end stage is supplied with a clock signal /CLK, and nodes n3 of the voltage transfer circuits 21-2, . . . , following the voltage transfer circuit 21-1 in the front end stage are respectively connected to nodes n1 of preceding voltage transfer circuits 21.

The other terminals of those of (N−1) capacitors which have terminals connected to nodes n2 of the voltage transfer circuits 21 in odd-numbered stages among N voltage transfer circuits 21 longitudinally connected with each other in multiple stages are supplied with a clock signal CLK, while the other terminals of those of (N−1) capacitors which have terminals connected to nodes n2 of the voltage transfer circuits 21 in even-numbered stages are supplied with a clock signal /CLK.

Also, the present embodiment achieves a high voltage efficiency and requires a smaller number of stages (or number of voltage transfer circuits 21) than a conventional circuit to obtain a desired boosted voltage, so that the chip area can be greatly reduced. In addition, the number of capacitors which are components resulting in the largest current consumption in a booster circuit, so that the entire current consumption is greatly reduced.

In the booster circuits according to the embodiments described above, a positive voltage VDD is boosted to generate a voltage higher than VDD. Needless to say, the present invention is practically applicable to a booster circuit which boosts and generates a voltage of a negative polarity from a ground voltage GND. A booster circuit for a negative polarity can be realized by replacing PMOS transistors and a power source voltage VDD with NMOS transistors and a ground voltage GND, respectively, in a booster circuit for boosting a voltage of a positive polarity.

Figure 15:
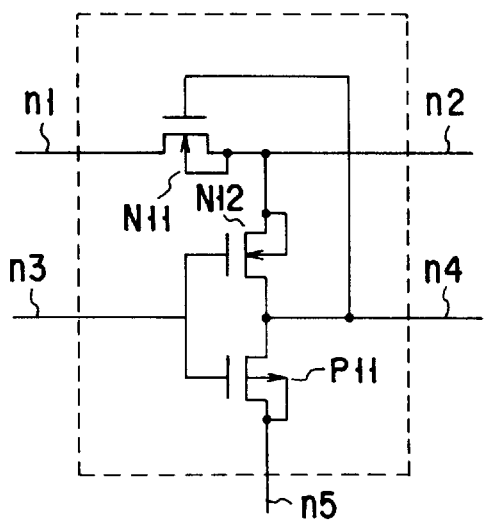
FIG. 15 is a circuit diagram showing an example of a voltage transfer circuit used in a booster circuit of the present invention.
Figure 16:
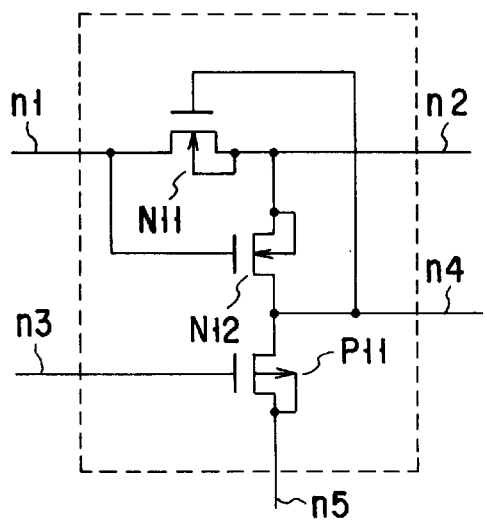
FIG. 16 is a circuit diagram showing another example of a voltage transfer circuit used in a booster circuit of the present invention.

FIGS. 15 and 16 respectively show examples of a voltage transfer circuit used in a booster circuit for boosting and generating a voltage of a negative polarity.

The voltage transfer circuit shown in FIG. 15 corresponds to that shown in FIG. 6. NMOS transistors N11 and N12 are used in place of PMOS transistors P1 and P2, and a PMOS transistor P11 is used in place of the NMOS transistor N1.

The voltage transfer circuit shown in FIG. 16 corresponds to that shown in FIG. 7. NMOS transistors N11 and N12 are used in place of PMOS transistors P1 and P2, and a PMOS transistor P11 is used in place of a NMOS transistor N1. Note that the voltage transfer circuit shown in FIG. 16 differs from that shown in FIG. 15 in that the gate terminal of the NMOS transistor N12 is connected to a node n1.

In the voltage transfer circuits shown in FIGS. 15 and 16, when a voltage equal to or lower than a ground voltage is transferred to a node n2 from a node n1, the voltage can be transferred without increasing the voltage equal to or lower than a ground voltage, supplied to the node n1, since the transistors for transferring the voltage are NMOS transistors.

Figure 17:
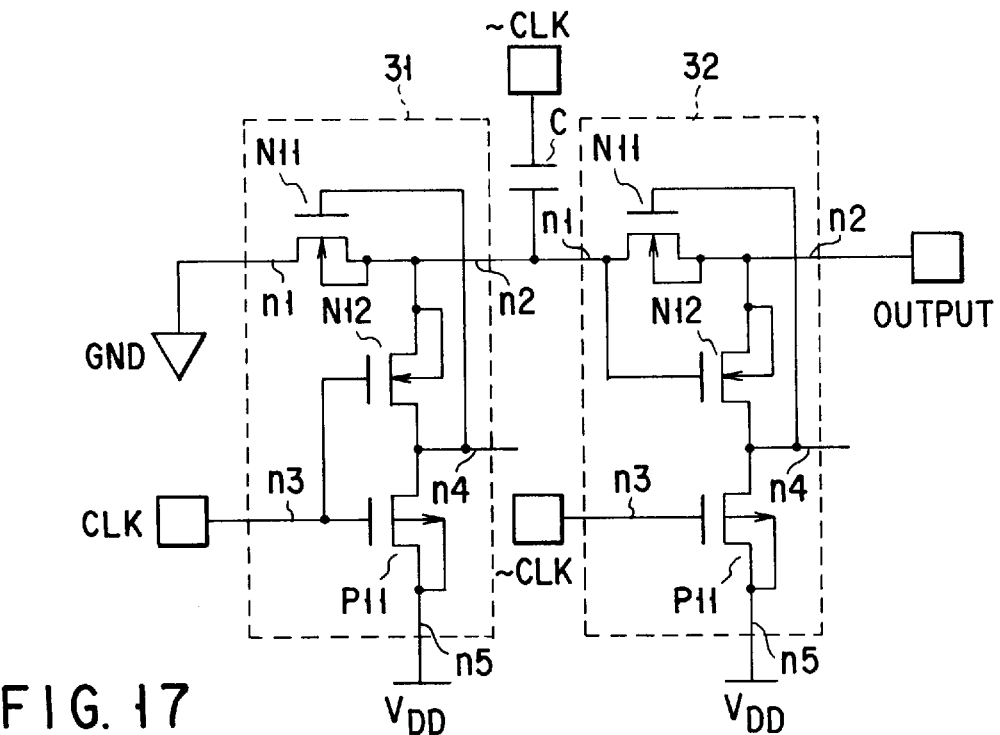
FIG. 17 shows a specific circuit diagram according to a seventh embodiment of a booster circuit of the present invention.

FIG. 17 shows a specific circuit diagram according to a seventh embodiment of a booster circuit according to the present invention, and corresponds to a booster circuit shown in FIG. 8, which serves to boost a voltage of a positive polarity. Specifically, the booster circuit serves to generate a voltage of −VDD from a ground voltage and a power source voltage VDD supplied from a battery 15 shown in FIG. 5, and is constructed by a combination of a voltage transfer circuit 31 shown in FIG. 15, a voltage transfer circuit 32 shown in FIG. 16, and a capacitor C.

The voltage transfer circuit 31 has a node n1 connected to a ground voltage GND, a node n3 supplied with a clock signal CLK, and a node n5 connected to a power source voltage. In addition, the node n2 is connected to a terminal of the capacitor C. The other terminal of the capacitor C is supplied with a clock signal /CLK.

The other voltage transfer circuit 32 has a node n1 connected to the node n2 of the voltage transfer circuit 31. From a node n2 of the voltage transfer circuit 32, a voltage of a negative polarity is outputted. The voltage transfer circuit 32 has a node n5 connected to a power source voltage.

The booster circuit constructed as described above operates in the following manner.

Firstly, when the clock signal CLK is of a logic 0 level (GND) and the clock signal /CLK is of a logic 1 level (VDD), the PMOS transistor P11 in the voltage transfer circuit 31 is turned on and a voltage of VDD is supplied through the PMOS transistor P11 to the gate terminal of the NMOS transistor N11 in the same voltage transfer circuit 31. Therefore, the source terminal of the NMOS transistor N11 has a ground voltage GND. In this state, the NMOS transistor is turned off.

In the other voltage transfer circuit 32, the PMOS transistor P11 is turned off. Although the gate terminal of the NMOS transistor N12 is at a GND level, the NMOS transistor N12 would be turned on if the source terminal (or the output terminal of a boosted voltage) thereof was at a lower level than GND. However, since the PMOS transistor P11 is turned off, the gate terminal of the NMOS transistor N11 does not go to a level higher than GND, and therefore, the NMOS transistor N11 is turned off.

Next, the clock signal CLK goes to a logic 1 level and the clock signal /CLK goes to a logic 0 level from this state, the NMOS transistor N12 is turned on and the PMOS transistor P11 is turned off in the voltage transfer circuit 31. As a result of this, the source and gate terminals of the NMOS transistor N11 have an equal potential (GND) and the NMOS transistor N11 is turned off. At the same time, the clock signal /CLK supplied to the other terminal of the capacitor C changes to a GND level to a VDD level, so that the voltage at the terminal of the capacitor C, i.e., at the node n2 of the voltage transfer circuit 31 is boosted from a GND level to a (GND−VDD) level, i.e., in the negative direction of −VDD.

In the other voltage transfer circuit 32, the PMOS transistor P11 is turned on and the gate terminal of the NMOS transistor N11 goes to a VDD level, so that the NMOS transistor N11 is turned on. In this state, the gate terminal of the NMOS transistor N12 is of a level of −VDD, so that the NMOS transistor N12 is turned off. Therefore, a voltage of −VDD at the drain terminal of the NMOS transistor N11 is transferred to the output terminal of a boosted voltage.

Further, when the clock signal CLK goes to a logic 0 level and the clock signal /CLK goes to a logic 1 level, the initial state is recovered and the NMOS transistor N11 in the other voltage transfer circuit 32 is turned off. Therefore, the level of −VDD at the output terminal of the boosted voltage is maintained without change.

As has been described above, the booster circuit according to the seventh embodiment can obtain a boosted voltage of a negative value of −VDD which is lower by VDD than a ground voltage GND, without a voltage drop of the forward voltage component of a diode in a conventional circuit shown in FIG. 1 or without a voltage drop of the threshold voltage component of an NMOS transistor in a conventional circuit shown in FIGS. 3 and 4.

Figure 18:
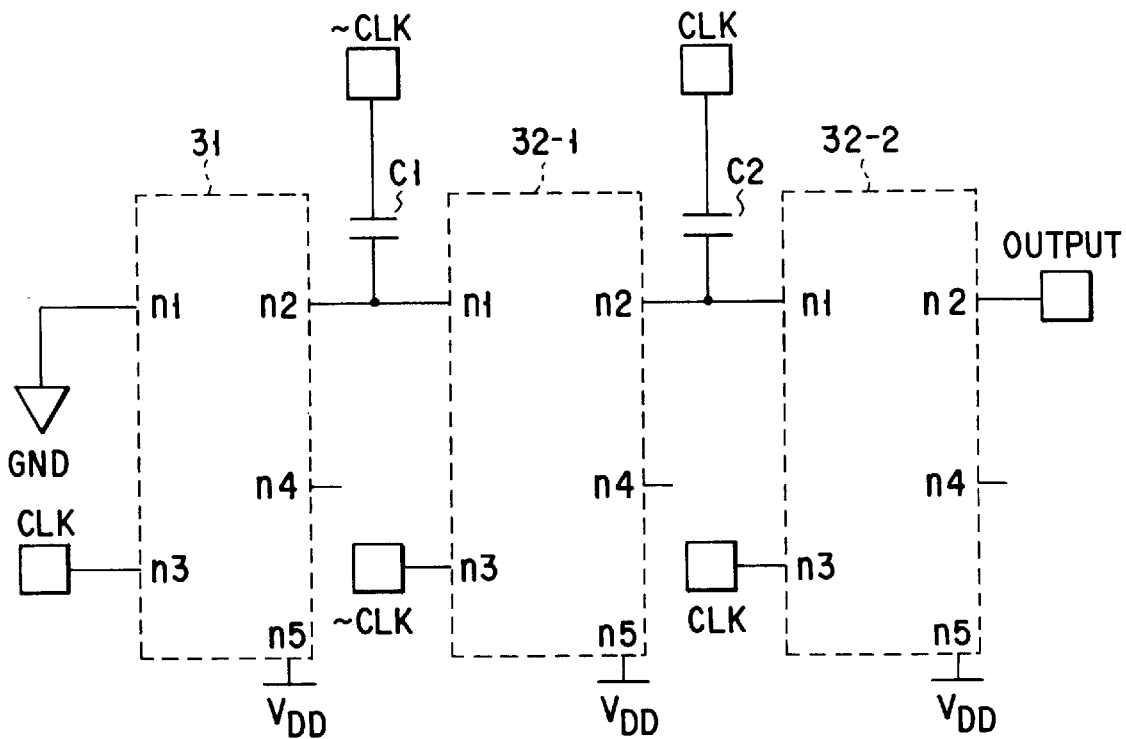
FIG. 18 shows a specific circuit diagram according to an eighth embodiment of a booster circuit of the present invention.

FIG. 18 shows a specific circuit diagram according to an eighth embodiment in which the embodiment shown in FIG. 17 is enhanced and the present invention is practically applied to a booster circuit for boosting a voltage in a negative direction to −2 VDD.

The booster circuit is constructed by a combination of a voltage transfer circuit 31 shown in FIG. 15, two voltage transfer circuits 32-1 and 32-2 each shown in FIG. 16, and two capacitors C1 and C2.

The voltage transfer circuit 31 has a node n1 connected to a ground voltage GND, and a node n3 supplied with a clock signal CLK. A node n2 thereof is connected to a terminal of the capacitor C1. The other terminal of the capacitor C1 is supplied with a clock signal /CLK.

The two voltage transfer circuits 32-1 and 32-2 are longitudinally connected with each other in multiple stages, such that the node 2 in a front stage is connected to the node n1 in a rear stage, and the node n1 of the voltage transfer circuit 32-1 in the front stage is connected to the node n2 of the voltage transfer circuit 31. The node n2 of the voltage transfer circuit 32-2 in the rear stage is connected to an output terminal of a boosted voltage. In addition, a node n3 of the voltage transfer circuit 32-1 in the front stage is supplied with a clock signal /CLK, and a node n3 of the voltage transfer circuit 32-2 in the rear stage is supplied with a clock signal CLK. Further, a terminal of the other capacitor C2 is connected to a connection node between the node n2 of the voltage transfer circuit 32-1 in the front stage and the node n1 of the voltage transfer circuit 32-2 in the rear stage, and the other terminal of the capacitor C2 is supplied with a clock signal CLK.

Since the present embodiment is constructed by adding a voltage transfer circuit 32-2 and a capacitor C2 to the embodiment shown in FIG. 17, a voltage boosted to −VDD can be obtained at the connection node between the node n2 of the voltage transfer circuit 32-1 in the front stage and the node n1 of the voltage transfer circuit 32-2 in the rear stage, without any other increase in voltage than that caused by a leakage current, like in the case shown in FIG. 17. Further, since the present embodiment is thus added with a voltage transfer circuit 32-2 and a capacitor C2, a voltage boosted to −2 VDD can be obtained at the output terminal.

Although the present embodiment has been explained with reference to a case in which two voltage transfer circuits 32-1 and 32-2 and two capacitors C1 and C2 are provided in addition to a voltage transfer circuit 31 to obtain a boosted voltage of −2 VDD, the present embodiment can be constructed to obtain a boosted voltage of −VDD×N by providing N voltage transfer circuits 32 and N capacitors in addition to the voltage transfer circuit 31 (where N is a positive integer). In this case, N voltage transfer circuits 32 are longitudinally connected with each other in multiple stages, such that a node N2 in each stage is connected to a node n1 of a successive stage, and terminals of N capacitors, in one end of each capacitor, are respectively connected to nodes n1 of voltage transfer circuits 32.

Further, the node n3 of the voltage transfer circuit 31 is supplied with a clock signal CLK. In N voltage transfer circuits 32 longitudinally connected with each other in multiple stages, a clock signal /CLK is supplied to nodes n3 of the voltage transfer circuits 32 in the odd-numbered stages including the front end stage, while a clock signal CLK is supplied to nodes n3 of the voltage transfer circuits 32 in the even-numbered stages.

The other terminals of those N capacitors which have terminals connected to the nodes n1 of the voltage transfer circuits 32 in the odd-numbered stages among the voltage transfer circuits 32 longitudinally connected with each other in multiple stages are supplied with a clock signal /CLK, and the other terminals of those N capacitors which have terminals connected to the nodes n1 of the voltage transfer circuits 32 in the even-numbered stages are supplied with a clock signal CLK.

Figure 19:
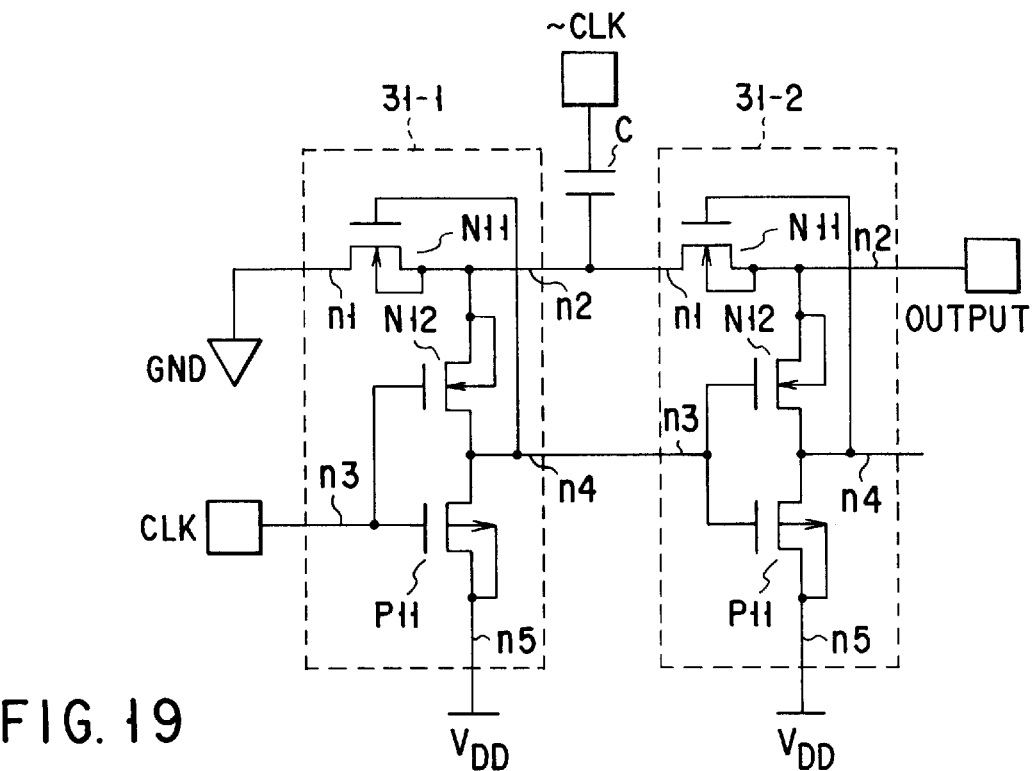
FIG. 19 shows a specific circuit diagram according to a ninth embodiment of a booster circuit of the present invention.

FIG. 19 shows a specific circuit diagram of a ninth embodiment of a booster circuit for generating a boosted voltage having a negative polarity, according to the present invention. The booster circuit uses a ground voltage GND and a power source voltage VDD supplied from a battery 15 shown in FIG. 5, to generate a boosted voltage of −VDD, and is constructed by a combination of two voltage transfer circuits 31-1 and 31-2 each shown in FIG. 15 and a capacitor C.

The voltage transfer circuit 31-1 has anode n1 connected to a ground voltage GND, a node 3 supplied with a clock signal CLK, and a node n2 connected with a terminal of the capacitor C. The other terminal of the capacitor C is supplied with a clock signal /CLK.

A node n1 of the other voltage transfer circuit 31-2 is connected to the node n2 of the voltage transfer circuit 31-1. Further, a boosted voltage is outputted from a node n2 of the voltage transfer circuit 32-2. In addition, a node 3 of the voltage transfer circuit 32-2 is connected to a node n4 of the voltage transfer circuit 32-1. Note that nodes n5 of both the voltage transfer circuits 31-1 and 31-2 are commonly connected to a power source voltage VDD.

The booster circuit constructed as described above differs from that shown in FIG. 17 only in that the gate terminal of the NMOS transistor N12 and the gate terminal of the PMOS transistor P111 in the voltage transfer circuit 31-2 are commonly connected to the node n3, and the node n3 is connected to the node n4 of the voltage transfer circuit 31-1. Basic operation of this booster circuit therefore is similar to that of the circuit shown in FIG. 17, and explanation thereof will be omitted herefrom.

According to the present embodiment, a boosted voltage having a value of −VDD can be obtained without an increase in voltage except for any other increase in voltage than that caused by a leakage, like in the booster circuit according to the seventh embodiment shown in FIG. 17.

Figure 20:
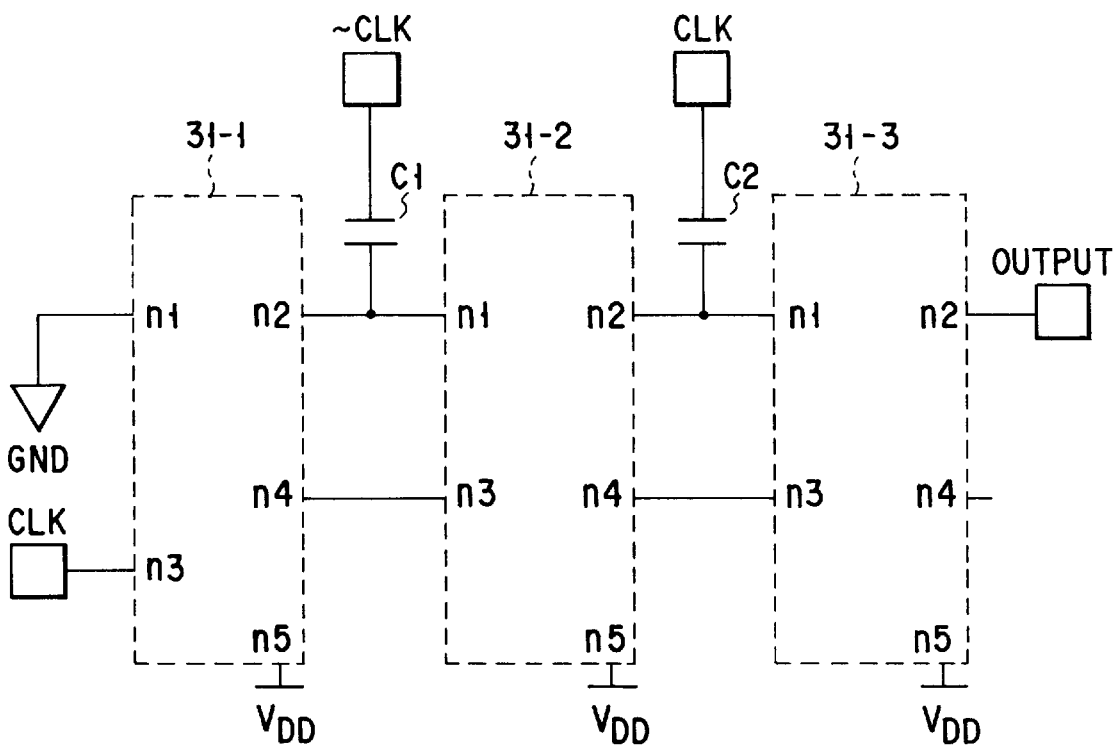
FIG. 20 shows a specific circuit diagram according to a tenth embodiment of a booster circuit of the present invention.

FIG. 20 shows a specific circuit diagram according to a tenth embodiment in which the embodiment shown in FIG. 19 is enhanced and the present invention is practically applied to a booster circuit for boosting a voltage to −2 VDD.

The booster circuit is constructed by a combination of three voltage transfer circuits 31-1, 31-2, and 31-3 each shown in FIG. 15 and two capacitors C1 and C2.

The three voltage transfer circuits 31-1, 31-2, and 31-3 are longitudinally connected with each other in multiple stages such that a node n2 in each stage is connected to a node n1 in a successive stage and a node n4 in each stage is connected to a node n3 in a successive stage. The node n1 of the voltage transfer circuit 31-1 in the front end stage is connected to a ground voltage GND and the node n2 of the voltage transfer circuit 31-3 in the last stage is connected to an output terminal of a boosted voltage. In addition, the node n3 of the voltage transfer circuit 31-1 in the front end stage is supplied with a clock signal CLK. Further, a terminal of the capacitor C1 is connected to a connection node between the node n2 of the voltage transfer circuit 31-1 and the node n1 of the voltage transfer circuit 31-2, and the other terminal of the capacitor C1 is supplied with a clock signal /CLK. A terminal of the capacitor C2 is connected to a connection node between the node n2 of the voltage transfer circuit 31-2 and the node n1 of the voltage transfer circuit 31-3, and the other terminal of the capacitor C2 is supplied with a clock signal CLK.

Since the present embodiment is constructed by adding a voltage transfer circuit 31-3 and a capacitor C2 to the embodiment shown in FIG. 19, a negative voltage boosted to −VDD can be obtained at the connection node between the node n2 of the voltage transfer circuit 31-2 and the node n1 of the voltage transfer circuit 31-3, without any other decrease in voltage than that caused by a leakage current, like in the case shown in FIG. 19. Further, since the present embodiment is thus added with a voltage transfer circuit 31-3 and a capacitor C2, a voltage boosted to −2 VDD can be obtained at an output terminal.

The present embodiment has been explained with reference to a case in which three voltage transfer circuits 31-1, 31-2, and 31-3 and two capacitors C1 and C2 are provided to obtain a voltage boosted to −2 VDD. However, the present embodiment can be arranged so as to obtain a boosted voltage much lower than −2 VDD, by providing N voltage transfer circuits 31 and (N−1) capacitors (where N is a positive integer. In this case, N voltage transfer circuits 31 are longitudinally connected with each other in multiple stages such that a node n2 in each stage is connected to a node n1 in a successive stage and a node n4 in each stage is connected to a node n3 in a successive stage, and terminals of N capacitors, in one end of each capacitor, are respectively connected to connection nodes each connecting a node n2 of a voltage transfer circuit 31 in a stage with a node n1 of a voltage transfer circuit 31 in a successive stage.

Further, the node n3 of the voltage transfer circuit 31-1 in the front end stage is supplied with a clock signal CLK. The other terminals of those of (N−1) capacitors which have terminals connected to the nodes n2 of the voltage transfer circuits 31 in odd-numbered stages among N voltage transfer circuits 31 longitudinally connected with each other in multiple stages are supplied with a clock signal /CLK, and the other terminals of those of (N−1) capacitors which have terminals connected to the nodes n2 of the voltage transfer circuits 31 in even-numbered stages are supplied with a clock signal CLK.

The present embodiment also achieves a high voltage efficiency and requires a smaller number of stages than a conventional circuit to obtain a desired boosted voltage, so that the chip area can be greatly reduced. In addition, since the number of capacitors which resulting in the greatest current consumption in a booster circuit is reduced, the entire current consumption is greatly reduced.

Figure 21:
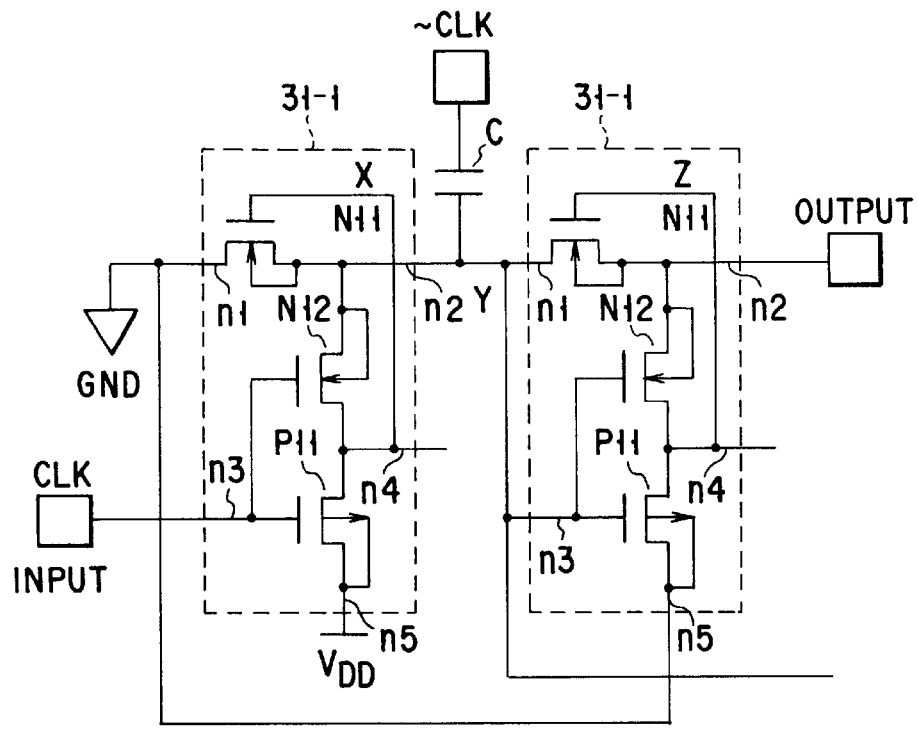
FIG. 21 shows a specific circuit diagram according to an eleventh embodiment of a booster circuit of the present invention.

FIG. 21 shows a specific circuit diagram of an eleventh embodiment of a booster circuit for boosting a negative voltage, according to the present invention. In the booster circuit, the same modification as in the fifth embodiment shown in FIG. 13 is applied to the booster circuit shown in FIG. 19, and therefore has a structure substantially similar to that shown in FIG. 19. Only the differences from the booster circuit shown in FIG. 19 will be explained below.

In the embodiment shown in FIG. 19, the node n3 of the voltage transfer circuit 31-2 in the rear stage is connected to the node n4 of the voltage transfer circuit 31-1 in the front stage, and the node n5 of the voltage transfer circuit 31-2 in the rear stage is connected to a power source voltage VDD. However, in the booster circuit of the present embodiment, the node n3 of the voltage transfer circuit 31-2 in the rear stage is connected to the node n1 of the same voltage transfer circuit 31-2 and the node n5 of the voltage transfer circuit 31-2 in the rear stage is connected to the node n1 of the voltage transfer circuit 31-1 in the front stage, in place of a VDD.

In the present embodiment, when the clock signal CLK goes to a logic 0 level, the signal Y at the node of a terminal of the capacitor C falls to −VDD, thereby turning on the NMOS transistor N11 in the voltage transfer circuit 31-2 in the rear stage. When the voltage thus boosted in a negative direction is transferred to an output terminal, the PMOS transistor P11 in the same voltage transfer circuit 31-2 must be turned on so that the gate terminal of the NMOS transistor N11 is supplied with a voltage higher than −VDD by at least a value equivalent to the threshold voltage of the NMOS transistor. In the circuit shown in FIG. 19, the source terminal of the PMOS transistor P11 is connected to a power source voltage VDD and the VDD is supplied to the gate terminal of the NMOS transistor N11, to turn on this transistor N11. However, in the circuit according to the present embodiment, a ground voltage GND higher than −VDD is supplied to the source terminal of the PMOS transistor P11 thereby to turn on the PMOS transistor P11, and the ground voltage GND is supplied to the gate terminal of the NMOS transistor N11 thereby to turn on the NMOS transistor N11.

Figure 22:
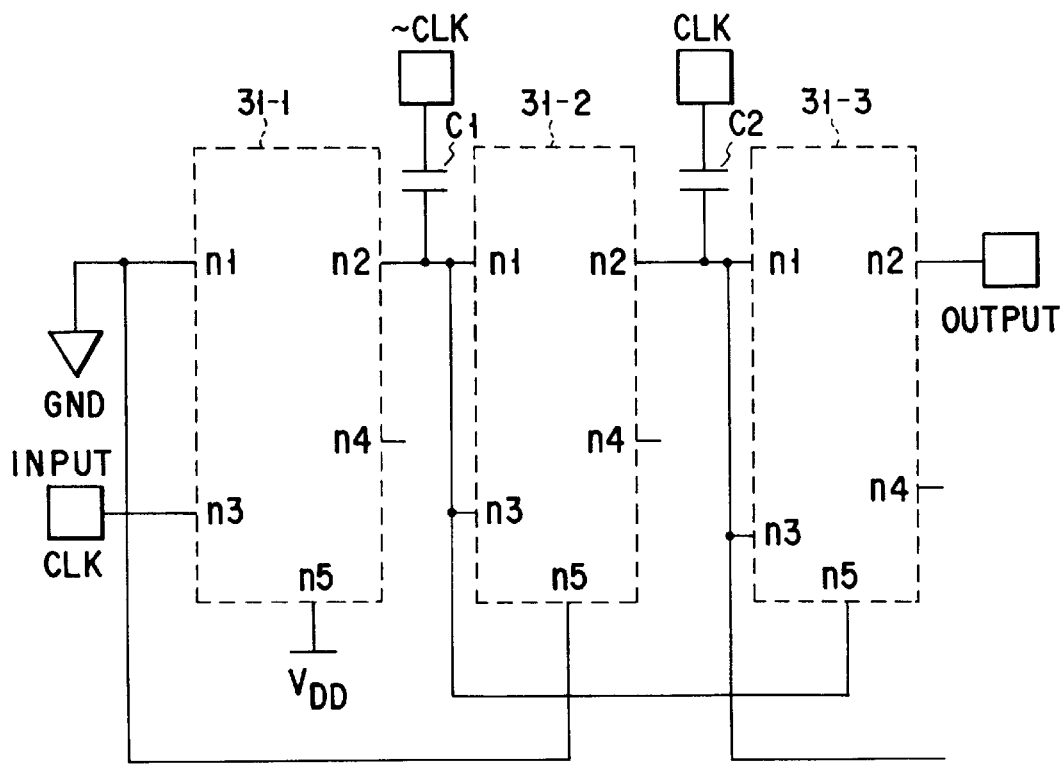
FIG. 22 shows a specific circuit diagram according to a twelfth embodiment of a booster circuit of the present invention.

FIG. 22 shows a specific circuit diagram according to a twelfth embodiment in which the embodiment shown in FIG. 21 is enhanced and the present invention is practically applied to a booster circuit for boosting twice a voltage to −2 VDD.

The booster circuit is constructed by a combination of voltage transfer circuits 31-1, 31-2, and 31-3 each shown in FIG. 15 and two capacitors C1 and C2.

The three voltage transfer circuits 31-1, 31-2, and 31-3 are longitudinally connected with each other in multiple stage such that a node n2 in each stage is connected to a node n1 in a successive stage, that a node n1 of the voltage transfer circuit 31-1 in the front end stage is connected to a ground voltage GND, and that a node n2 of the voltage transfer circuit 31-3 in the last stage is connected to an output terminal of a boosted voltage. In addition, the node n2 of the voltage transfer circuit 31-1 in the front end stage is supplied with a clock signal CLK. A node n5 of the voltage transfer circuit 31-1 in the front end stage is connected to a power source voltage VDD. A node n5 of the voltage transfer circuit 31-2 in the second stage is connected to the node n1 of the voltage transfer circuit 31-1 in the preceding front end stage. The node n5 of the voltage transfer circuit 31-3 in the last stage is connected to the node n1 of the voltage transfer circuit 31-2 in the preceding second stage.

Further, a terminal of the capacitor C1 is connected to a connection node between the node n2 of the voltage transfer circuit 31-1 and the node n1 of the voltage transfer circuit 31-2, and the other terminal of the capacitor C1 is supplied with a clock signal /CLK. A terminal of the capacitor C2 is connected to a connection node between the node n2 of the voltage transfer circuit 31-2 and the node n1 of the voltage transfer circuit 31-3, and the other terminal of the capacitor C2 is supplied with a clock signal CLK.

Since the present embodiment is constructed by adding a voltage transfer circuit 31-3 and a capacitor C2 to the embodiment shown in FIG. 21, a voltage boosted to −VDD can be obtained at the connection node between the node n2 of the voltage transfer circuit 31-1 and the node n1 of the voltage transfer circuit 31-2, without any other increase in voltage than that caused by a leakage current, like in the case shown in FIG. 21. Further, since the present embodiment is thus added with a voltage transfer circuit 31-3 and a capacitor C2, a voltage boosted to −2 VDD can be obtained at the output terminal.

The present embodiment has been explained with reference to a case in which three voltage transfer circuits 31-1, 31-2, and 31-3 and two capacitors C1 and C2 are provided to obtain a boosted voltage of −2 VDD. However, the present embodiment can be constructed so as to obtain a boosted voltage much lower than −2 VDD can be obtained by providing N voltage transfer circuits 31 and (N−1) capacitors (where N is a positive integer greater than 2). In this case, N voltage transfer circuits are longitudinally connected with each other in multiple stages, such that a node n2 in each stage is connected to a node n1 in a successive stage, and terminals of (N−1) capacitors, in one end of each capacitor, are respectively connected to connection nodes each connecting a node n2 of a voltage transfer circuit 31 in a stage with a node n1 of a voltage transfer circuit 31 in a successive stage.

Further, the node n3 of the voltage transfer circuit in the front end stage is supplied with a clock signal CLK, and the nodes n3 of each of the voltage transfer circuits 31-2 in the following stages, . . . , is connected to the node n1 of the voltage transfer circuit in a preceding stage.

In addition, the other terminals of those of (N−1) capacitors which have terminals connected to nodes n2 of voltage transfer circuits 31 in odd odd-numbered stages including the front end stage are supplied with a clock signal /CLK while the other terminals of those of (N−1) capacitors which have terminals connected to nodes n2 of voltage transfer circuits 31 in even-numbered stages are supplied with a clock signal CLK.

The present embodiment also achieves a high voltage efficiency and can obtain a desired boosted voltage with a smaller number of stages than a conventional circuit, so that the chip area can be greatly reduced. In addition, the number of capacitors which are components having a largest current consumption in a booster circuit, the entire current consumption can be greatly reduced.

Figures 23, 25:
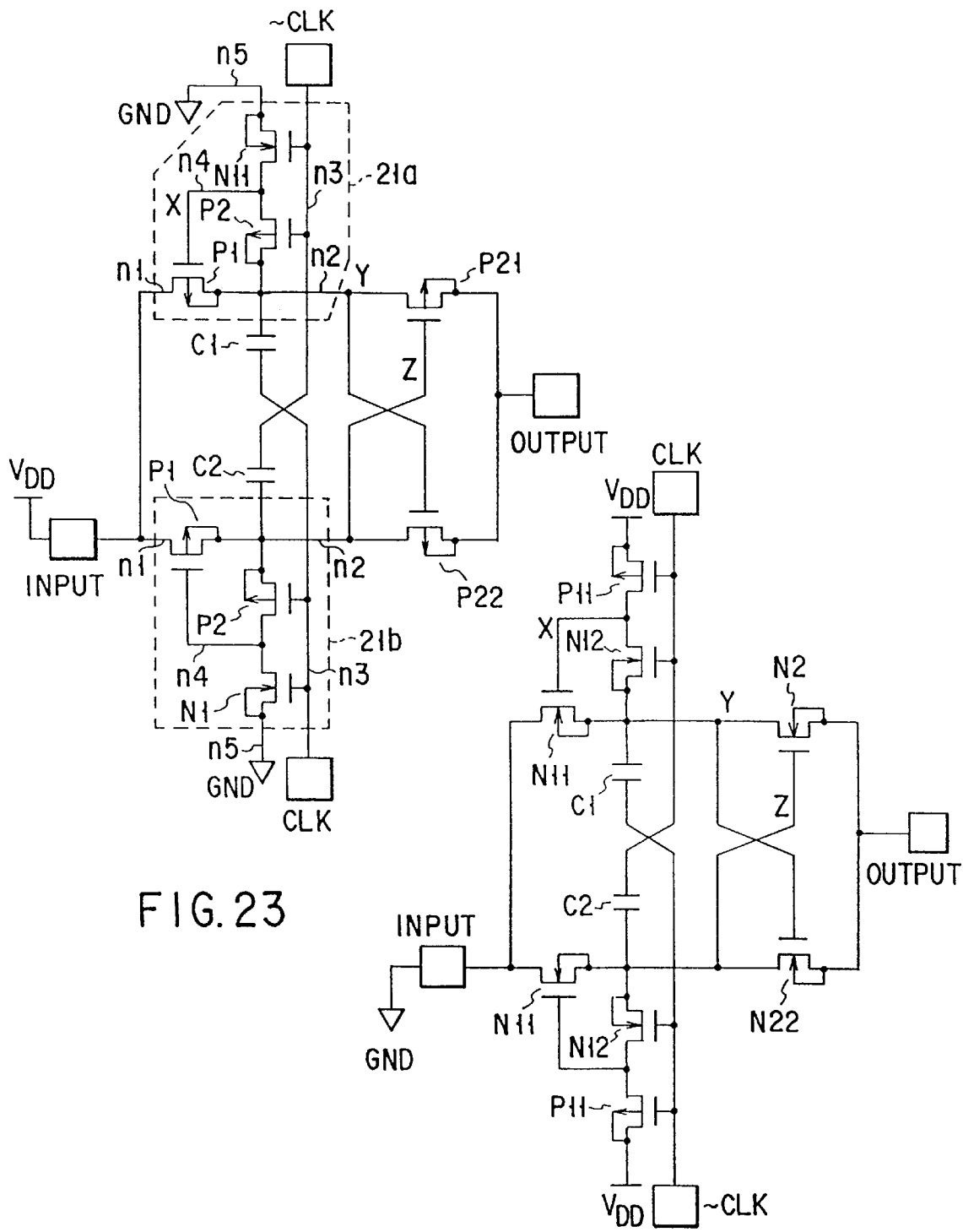
FIG. 23 shows a specific circuit diagram according to a thirteenth embodiment of a booster circuit of the present invention.
FIG. 25 shows a specific circuit diagram according to a fourteenth embodiment of a booster circuit of the present invention.
Figure 24:
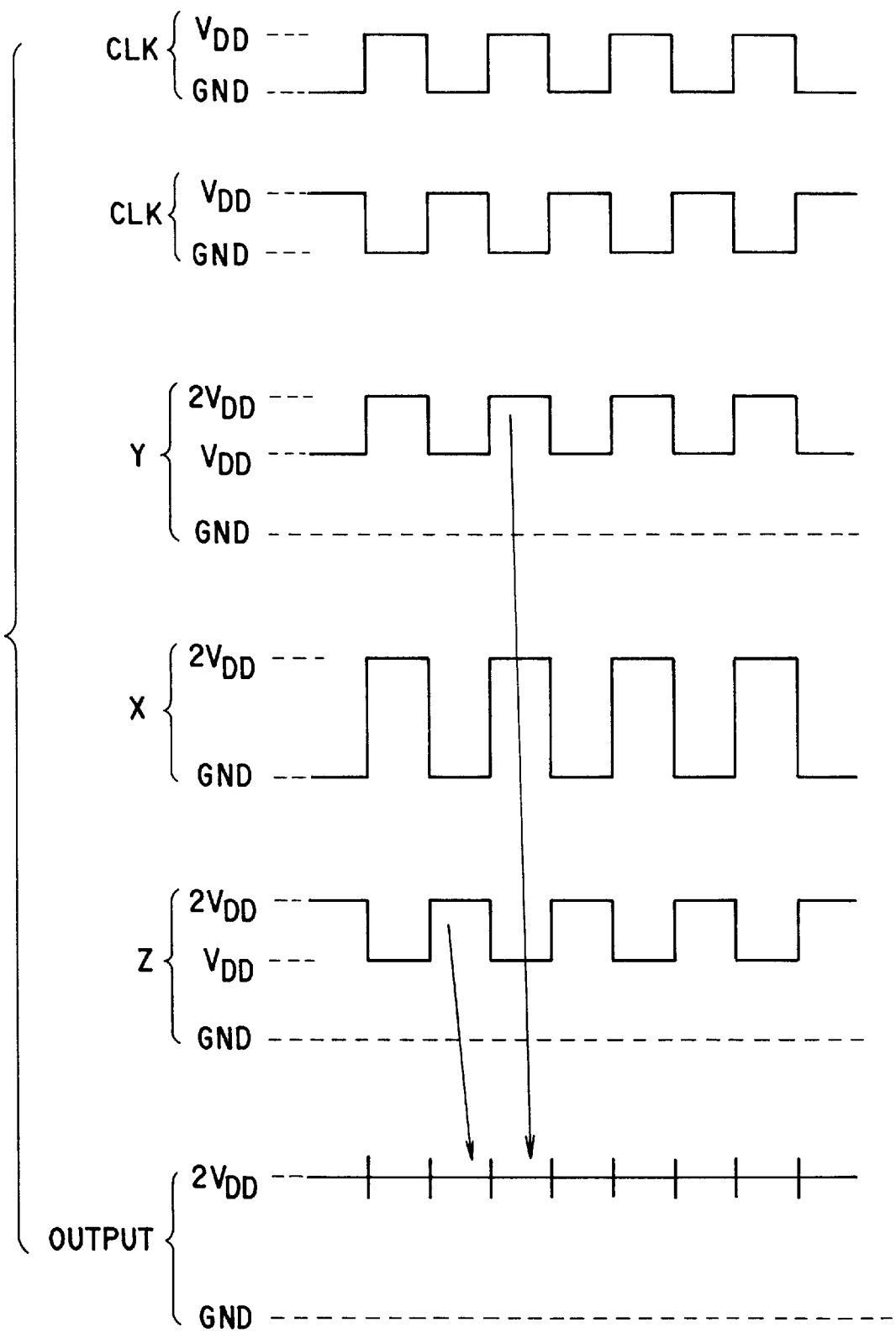
FIG. 24 is a waveform chart showing an example of operation of a booster circuit of the present invention.

FIG. 23 shows a specific circuit diagram according to a thirteenth embodiment of a booster circuit shown in FIG. 5. As shown in FIG. 6, the present embodiment is provided with two voltage transfer circuits 21a and 21b each consisting of two PMOS transistors P1 and P2 and an NMOS transistor N1. Nodes n1 of both the voltage transfer circuits 21a and 21b are commonly connected to a power source voltage VDD, and the node n3 of the voltage transfer circuit 21a is supplied with a clock signal /CLK while the node n3 of the other voltage transfer circuit 21b is supplied with a clock signal CLK. Nodes n5 of both the voltage transfer circuits 21a and 21b are commonly connected to a ground voltage GND.

Further, two capacitors C1 and C2 are provided, and a terminal of the capacitor C1 is connected to the node n2 of the voltage transfer circuit 21a while the other terminal of the capacitor C1 is supplied with a clock signal CLK. A terminal of the other capacitor C2 is connected to the node n2 of the voltage transfer circuit 21b, while the other terminal of the capacitor C2 is supplied with a clock signal /CLK.

Further, source and drain terminals of the PMOS transistor P21 are connected between the node n2 of the voltage transfer circuit 21a and an output terminal of a boosted voltage. The gate terminal of the PMOS transistor P21 is connected to the node n2 of the voltage transfer circuit 21b. Likewise, source and drain terminals of the PMOS transistor P22 are connected between the node n2 of the voltage transfer circuit 21b and the output terminal of a boosted voltage. The gate terminal of the PMOS transistor P22 is connected to the node n2 of the voltage transfer circuit 21a.

In the booster circuit constructed as described above, when the clock signal CLK rises to a logic 1 level, an input voltage VDD is boosted to 2 VDD by a circuit consisting of the voltage transfer circuit 21a and the capacitor C1, and the boosted voltage is outputted to the output terminal of a boosted voltage through the PMOS transistor P21. In another circuit consisting of the other voltage transfer circuit 21b and the capacitor C2, when the clock signal /CLK rises to a logic 1 level, an input voltage VDD is boosted to 2 VDD, which is outputted to the output terminal of a boosted voltage through the PMOS transistor P22.

The PMOS transistor P21 is turned off and does not supply electric charges when the signal Y at the node n2 of the voltage transfer circuit 21a is VDD and the signal Z at the node n2 of the other voltage transfer circuit 21b is 2 VDD. On the contrary, the PMOS transistor P21 is turned on and outputs a voltage of 2 VDD equal to the value of the signal Y to the output terminal, when the signal Y at the node n2 of the voltage transfer circuit 21a is 2 VDD and the signal z at the node n2 of the other voltage transfer circuit 21b is VDD. The other PMOS transistor P22 is turned on and off in the same manner as described above. Specifically, the PMOS transistor P22 is turned on and outputs a voltage of 2 VDD equal to the value of the signal Y to the output terminal when the signal Y at the node n2 of the voltage transfer circuit 21a is VDD and the signal Z at the node n2 of the other voltage transfer circuit 21b is 2 VDD. On the contrary, when the signal Y at the node n2 of the voltage transfer circuit 21a is 2 VDD and the signal Z at the node n2 of the other voltage transfer circuit 21b is VDD, the PMOS transistor P22 is turned off and does not supply electric charges to the output terminal.

Although the PMOS transistors P21 and P22 are thus turned on and off, depending on the voltages of the signals Y and Z, the transistors P21 and P22 are repeatedly turned on and off complementarily. Specifically, while the PMOS transistor P21 is turned off, the PMOS transistor P22 is turned on and supplies 2 VDD to the output terminal. While the PMOS transistor P22 is turned off, the PMOS transistor P21 is turned on and supplies 2 VDD to the output terminal.

Therefore, in the booster circuit according to the present embodiment, a voltage of 2 VDD can be outputted both when the clock signal CLK is of a logic 1 level and when it is of a logic 0 level, so that a decrease in output voltage caused by a leakage current is very small in comparison with a booster circuit according to the embodiment shown in FIG. 8. Besides, the amount of electric charges thus outputted can be doubled so that the boost efficiency is improved.

In order to obtain a much higher voltage of 3 VDD, 4 VDD, or more, N circuits each shown in FIG. 23 are prepared and cascade-connected such that the input terminal of each of N circuits is connected to the output terminal of another one of N circuits. In this manner, an output voltage of (N+1)VDD can be obtained.

The same way of thinking as adopted in the circuit shown in FIG. 23 can be applied to a booster circuit of a negative polarity.

FIG. 25 shows a specific circuit diagram of a booster circuit for generating a boosted voltage of a negative polarity, according to a fourteenth embodiment of the present invention.

In a booster circuit according to the present embodiment, NMOS transistors N11, N12, N21, and N22 and a PMOS transistor P11 are used in place of PMOS transistors P1, P2, P21, and P22 and an NMOS transistor N1 shown in FIG. 23. At the output terminal, a voltage of –VDD can be obtained with a very small increase in voltage caused by a leakage current. In this case, also, N circuits each shown in FIG. 25 are prepared and cascade-connected such that the input terminal of each of N circuits is connected to the output terminal of another one of N circuits, to obtain much lower voltage of –2 VDD, –3 VDD, or less. In this manner, an output voltage of –N·VDD can be obtained.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

We claim:

1. A booster circuit comprising:

a first MOS transistor of a first channel type having a drain terminal connected to a first node supplied with a predetermined voltage, a source terminal connected to a second node, and a gate terminal;

a second MOS transistor of a first channel type having a source terminal connected to the second node, a drain terminal connected to the gate terminal of the first MOS transistor, and a gate terminal supplied with a first clock signal;

a third MOS transistor of a second channel type having a drain terminal connected to the drain terminal of the second MOS transistor, a source terminal connected to a third node supplied with a reference voltage, and a gate terminal supplied with the first clock signal;

a capacitor having a first terminal connected to the second node and a second terminal supplied with a second clock signal having an inverse phase of the first clock signal;

a fourth MOS transistor of the first channel type having a drain terminal connected to the second node, a source terminal connected to a fourth node through which an output voltage is obtained, and a gate terminal;

a fifth MOS transistor of the first channel type having a source terminal connected to the fourth node, a drain terminal connected to the gate terminal of the fourth MOS transistor, and a gate terminal connected to the second node; and a sixth MOS transistor of the second channel type having a drain terminal connected to the drain terminal of the fifth MOS transistor, a source terminal connected to the third node, and a gate terminal supplied with the second clock signal.

2. A booster circuit according to claim 1, wherein the first to sixth MOS transistors have back gate terminals respectively connected to the source terminals of their own.

3. A booster circuit according to claim 1, wherein the predetermined voltage supplied to the first node is a voltage of a positive polarity, the MOS transistors of the first channel type are P-channel type MOS transistors, and the MOS transistors of the second channel type are N-channel type MOS transistors.

4. A booster circuit according to claim 1, wherein the predetermined voltage supplied to the first node is a ground voltage, the MOS transistors of the first channel type are N-channel type MOS transistors, and the MOS transistors of the second channel type are P-channel type MOS transistors.

* * * * *